(12) United States Patent
Nakashima et al.

(10) Patent No.: US 9,369,971 B2
(45) Date of Patent: Jun. 14, 2016

(54) MOBILE STATION DEVICE, COMMUNICATION SYSTEM, COMMUNICATION METHOD, AND INTEGRATED CIRCUIT

(75) Inventors: Daiichiro Nakashima, Osaka (JP); Wataru Ouchi, Osaka (JP); Shoichi Suzuki, Osaka (JP); Kimihiko Imamura, Osaka (JP); Yosuke Akimoto, Osaka (JP); Katsunari Uemura, Osaka (JP); Yasuyuki Kato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/346,894

(22) PCT Filed: Aug. 13, 2012

(86) PCT No.: PCT/JP2012/070604
§ 371 (c)(1),
(2), (4) Date: Mar. 24, 2014

(87) PCT Pub. No.: WO2013/046964
PCT Pub. Date: Apr. 4, 2013

(65) Prior Publication Data
US 2014/0221038 A1 Aug. 7, 2014

(30) Foreign Application Priority Data
Sep. 28, 2011 (JP) .................................. 2011-211770

(51) Int. Cl.
*H04B 7/00* (2006.01)
*H04W 52/24* (2009.01)
(Continued)

(52) U.S. Cl.
CPC ............ *H04W 52/242* (2013.01); *H04W 24/00* (2013.01); *H04W 52/146* (2013.01);
(Continued)

(58) Field of Classification Search
USPC .............. 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | | |
|---|---|---|---|---|
| 7,085,541 B2* | 8/2006 | Redi | ..................... | H04W 52/10 342/367 |
| 8,693,362 B2* | 4/2014 | Damnjanovic et al. | ....... | 370/252 |

(Continued)

FOREIGN PATENT DOCUMENTS

JP 2011-097224 A 5/2011

OTHER PUBLICATIONS

Official Communication issued in International Patent Application No. PCT/JP2012/070604, mailed on Oct. 9, 2012.
(Continued)

*Primary Examiner* — Dominic Rego
(74) *Attorney, Agent, or Firm* — Keating & Bennett, LLP

(57) ABSTRACT

In a system including at least one base station device, the base station device efficiently controls uplink signals. A mobile station device includes a path loss calculation unit 4051 configured to calculate path losses, each based on one of a plurality of types of reference signals received by a reception processing unit 401, a transmit power setting unit 4053 configured to set a desired transmit power for an uplink signal using the path losses calculated by the path loss calculation unit 4051, and a power headroom control unit 4055 configured to generate a power headroom using the desired transmit power set by the transmit power setting unit 4053, the power headroom being information concerning transmit power to spare, and configured to control transmission of the power headroom. The power headroom control unit 4055 independently controls a power headroom transmission process that uses each of the path losses calculated based on the plurality of types of reference signals, using an independent parameter for each power headroom transmission process.

13 Claims, 12 Drawing Sheets

(51) Int. Cl.
*H04W 52/36* (2009.01)
*H04W 24/00* (2009.01)
*H04W 52/14* (2009.01)
*H04W 28/06* (2009.01)
*H04W 88/02* (2009.01)
*H04L 27/26* (2006.01)
*H04J 11/00* (2006.01)

(52) U.S. Cl.
CPC .......... *H04W52/246* (2013.01); *H04W 52/365* (2013.01); *H04J 11/0053* (2013.01); *H04L 27/261* (2013.01); *H04L 27/2636* (2013.01); *H04W 28/06* (2013.01); *H04W 88/02* (2013.01)

(56) References Cited

U.S. PATENT DOCUMENTS

| | | | | |
|---|---|---|---|---|
| 8,811,266 | B2 * | 8/2014 | Choi | H04W 72/1231 370/318 |
| 8,811,322 | B2 * | 8/2014 | Feuersanger et al. | 370/329 |
| 2002/0075939 | A1 * | 6/2002 | Zeira | H04W 52/225 375/130 |
| 2002/0080762 | A1 * | 6/2002 | Zeira | H04W 52/10 370/342 |
| 2009/0318180 | A1 * | 12/2009 | Yi et al. | 455/522 |
| 2010/0110999 | A1 * | 5/2010 | Li | H04W 52/242 370/329 |
| 2010/0173665 | A1 * | 7/2010 | Michel et al. | 455/522 |
| 2011/0038271 | A1 * | 2/2011 | Shin et al. | 370/252 |
| 2011/0105173 | A1 * | 5/2011 | Haim et al. | 455/522 |
| 2011/0159912 | A1 * | 6/2011 | Zong | 455/522 |
| 2011/0171988 | A1 * | 7/2011 | Kim et al. | 455/522 |
| 2011/0281525 | A1 * | 11/2011 | Furuskar et al. | 455/67.11 |
| 2011/0319112 | A1 * | 12/2011 | Jeong et al. | 455/509 |
| 2012/0028630 | A1 * | 2/2012 | Yamamoto | H04W 52/242 455/422.1 |
| 2012/0046064 | A1 * | 2/2012 | Baldemair et al. | 455/522 |
| 2012/0178494 | A1 * | 7/2012 | Haim et al. | 455/522 |
| 2012/0263060 | A1 | 10/2012 | Suzuki et al. | |
| 2013/0003589 | A1 * | 1/2013 | Gage | H04J 11/005 370/252 |

OTHER PUBLICATIONS

Samsung, "UL PC for Networks with Geographically Distributed RRHs", 3GPP TSG-RAN1#66 meeting, R1-112523, Athens, Greece, Aug. 22-26, 2011, pp. 1-5.

Intel Corporation, "Uplink Power Control Discussion for CoMP Scenario 4", 3GPP TSG-RAN WG1 #66, R1-112228, Athens, Greece, Aug. 22-26, 2011, 16 pages.

HT mMobile Inc., "Discussion on PHR for Carrier Aggregation", 3GPP TSG-RAN WG2 #70, R2-103012, Montreal, Canada, May 10-14, 2010, 4 pages.

Nakashima et al.; "Mobile Station Apparatus, Communication System, Communication Method, and Integrated Circuit"; U.S. Appl. No. 14/347,900, filed Mar. 27, 2014.

Nakashima et al.; "Mobile Station Apparatus, Communication System, Communication Method, and Integrated Circuit"; U.S. Appl. No. 14/354,176, filed Apr. 25, 2014.

* cited by examiner

MOBILE STATION DEVICE, COMMUNICATION SYSTEM, COMMUNICATION METHOD, AND INTEGRATED CIRCUIT

TECHNICAL FIELD

The present invention relates to a mobile station device, a communication system, a communication method, and an integrated circuit that may achieve efficient transmission of uplink signals in a communication system including a plurality of mobile station devices and a base station device.

BACKGROUND ART

The evolution of radio access schemes and radio networks for cellular mobile communication (hereinafter referred to as "Long Term Evolution (LTE)" or "Evolved Universal Terrestrial Radio Access (EUTRA)") has been standardized by the 3rd Generation Partnership Project (3GPP). In LTE, an Orthogonal Frequency Division Multiplexing (OFDM) scheme, which is a multi-carrier transmission method, is used as a communication scheme for radio communication from a base station device to a mobile station device (downlink; called DL). In LTE, furthermore, an SC-FDMA (Single-Carrier Frequency Division Multiple Access) scheme, which is a single-carrier transmission method, is used as a communication scheme for radio communication from a mobile station device to a base station device (uplink; called UL). In LTE, a DFT-Spread OFDM (Discrete Fourier Transform-Spread OFDM) scheme is used as the SC-FDMA scheme.

In 3GPP, a radio access scheme and a radio network (hereinafter referred to as "Long Term Evolution-Advanced (LTE-A)" or "Advanced Evolved Universal Terrestrial Radio Access (A-EUTRA)") that implement data communication at a higher speed than that of LTE are under study. In LTE-A, there is a demand for backward compatibility with LTE. In LTE-A, it is requested that an LTE-A-enabled base station device simultaneously communicate with an LTE-A-enabled mobile station device and an LTE-enabled mobile station device, and that an LTE-A-enabled mobile station device communicate with an LTE-A-enabled base station device and an LTE-enabled base station device.

In LTE-A, to meet the request, at least supporting of the same channel structure as that of LTE is under study. The term "channel" means a medium used for the transmission of signals. A channel used in the physical layer is referred to as a physical channel, and a channel used in the Medium Access Control (MAC) layer is referred to as a logical channel. Types of physical channels include a physical downlink shared channel (PDSCH) used for the transmission and reception of downlink data and control information, a physical downlink control channel (PDCCH) used for the transmission and reception of downlink control information, a physical uplink shared channel (PUSCH) used for the transmission and reception of uplink data and control information, a physical uplink control channel (PUCCH) used for the transmission and reception of control information, a synchronization channel (SCH) used for the establishment of downlink synchronization, a physical random access channel (PRACH) used for the establishment of uplink synchronization, and a physical broadcast channel (PBCH) used for the transmission of downlink system information. A mobile station device or a base station device maps and transmits signals generated from control information, data, and the like on the respective physical channels. The data transmitted on the physical downlink shared channel or the physical uplink shared channel is referred to as a transport block.

The control information mapped on the physical uplink control channel is referred to as uplink control information (UCI). The uplink control information is control information (reception acknowledgement response; ACK/NACK) indicating a positive response (Acknowledgement: ACK) or a negative response (Negative Acknowledgement: NACK) to received data mapped on the physical downlink shared channel, or control information (Scheduling Request: SR) indicating a request for the allocation of uplink resources, or control information (Channel Quality Indicator: CQI) indicating the reception quality (also referred to as channel quality) in the downlink.

<Coordinated Communication>

In A-EUTRA, inter-cell coordinated communication (Co-operative Multipoint: CoMP communication) is under study in which neighboring cells coordinate with each other to perform communication in order to reduce or suppress interference with a mobile station device in the cell-edge area or in order to increase the received signal power. For example, a form of base station device that performs communication using an arbitrary frequency band is referred to as a "cell". For example, inter-cell coordinated communication of a type in which different weighted signal processing (precoding processing) methods are applied to a signal in a plurality of cells and a plurality of base station devices coordinate with each other to transmit a signal to the same mobile station device (also referred to as Joint Processing or Joint Transmission) and the like are under study. This method may increase the signal power to interference plus noise power ratio of the mobile station device, and may improve the reception performance of the mobile station device. For example, inter-cell coordinated communication of a type in which a plurality of cells coordinate with each other to perform scheduling for a mobile station device (Coordinated Scheduling: CS) is under study. This method may increase the signal power to interference plus noise power ratio of the mobile station device. For example, inter-cell coordinated communication of a type in which a plurality of cells coordinate with each other to apply beamforming to transmit a signal to a mobile station device (Coordinated beamforming: CB) is under study. This method may increase the signal power to interference plus noise power ratio of the mobile station device. For example, inter-cell coordinated communication of a type in which a signal is transmitted on only one cell using a certain resource while no signal is transmitted on the other cell using a certain resource (Blanking, Muting) is under study. This method may increase the signal power to interference plus noise power ratio of the mobile station device.

As for a plurality of cells used for coordinated communication, different cells may be configured by different base station devices, or different cells may be configured by different RRHs (Remote Radio Heads, each of which is an outdoor radio unit smaller than a base station device, also referred to as Remote Radio Unit: RRU) managed by the same base station device. Alternatively, different cells may be configured by a base station device and an RRH managed by the base station device, or different cells may be configured by a base station device and an RRH managed by another base station device different from the base station device.

A base station device with a wide coverage is generally referred to as a macro base station device. A base station device with a narrow coverage is generally referred to as a pico base station device or a femto base station device. Application of an RRH in an area that generally has a narrower coverage than a macro base station device is under study. A deployment like a communication system including a macro base station device and an RRH and configured such that the coverage supported by the macro base station device includes part or all of the coverage supported by the RRH is referred to as a heterogeneous-network deployment. A communication system with such a heterogeneous-network deployment in which a macro base station device and an RRH coordinate with each other to transmit signals to a mobile station device located in an overlapped coverage area is under study. The RRH is managed by the macro base station device, and its transmission and reception are controlled. The macro base station device and the RRH are connected via a wired line such as a fiber optic line or a wireless line that is based on relay technology. In this way, the macro base station device and the RRH execute coordinated communication using radio resources some or all of which are identical, thereby improving the total spectral efficiency (transmission capacity) within the area of the coverage established by the macro base station device.

A mobile station device can perform single-cell communication with a macro base station device or an RRH while located near the macro base station device or the RRH. That is, a given mobile station device communicates with a macro base station device or an RRH without using coordinated communication, and transmits and receives signals. For example, a macro base station device receives an uplink signal from a mobile station device that is close to the macro base station device. For example, an RRH receives an uplink signal from a mobile station device that is close to the RRH. In addition, while located near the edge (cell edge) of the coverage established by the RRH, the mobile station device needs to take measures against co-channel interference from a macro base station device. Multi-cell communication (coordinated communication) between the macro base station device and the RRH with the use of a CoMP scheme in order to reduce or suppress interference with a mobile station device in the cell-edge area is under study. In the CoMP scheme, neighboring base stations coordinate with each other.

Also under study is a mobile station device that receives signals transmitted from both a macro base station device and an RRH using coordinated communication in the downlink, and that transmits a signal in a form suitable for either a macro base station device or an RRH in the uplink. For example, a mobile station device transmits an uplink signal at a transmit power suitable for a macro base station device to receive the signal. For example, a mobile station device transmits an uplink signal at a transmit power suitable for an RRH to receive the signal. Accordingly, unnecessary uplink interference may be reduced and spectral efficiency may be increased.

Also under study is a mobile station device that estimates a path loss from each of a plurality of types of reference signals to set a transmit power parameter suitable for a macro base station device or an RRH to receive a signal (NPL 1). For example, a mobile station device calculates a transmit power parameter suitable for a macro base station device to receive a signal, using a reference signal transmitted from the macro base station device. For example, a mobile station device calculates a transmit power parameter suitable for an RRH to receive a signal, using a reference signal transmitted from the RRH. For example, a mobile station device calculates a transmit power parameter that is suboptimal for a macro base station device or an RRH to receive a signal, using a reference signal transmitted from both the macro base station device and the RRH in a coordinated way. Specifically, a mobile station device performs path loss estimation on the basis of the reception quality of a received reference signal.

Further, a mobile station device notifies a base station device of power headroom (PH) so that the base station device can recognize how much transmit power the mobile station device has left to transmit an uplink signal until a maximum transmit power value (allowable maximum transmit power value) that the mobile station device can use as the device capability is reached. The power headroom (PH) is given by subtracting a transmit power value used for the transmission of an uplink signal from the maximum transmit power value.

The power headroom shows a value in the range of −23 dB to 40 dB, and is represented in units of 1 dB. Power headroom with a positive value indicates that the mobile station device has transmit power left. A power headroom with a negative value indicates that the mobile station device is in transmission state with the allowable maximum transmit power value although the mobile station device has been requested by a base station device to perform transmission with a transmit power value exceeding the allowable maximum transmit power value. The base station device adjusts and determines the frequency bandwidth of resources to be allocated to an uplink signal of the mobile station device, the modulation scheme of the uplink signal, and so on using information on the power headroom.

The mobile station device controls power headroom transmissions using two timers (periodicPHR-Timer and prohibitPHR-Timer) and one value dl-PathlossChange (expressed in dB) that are notified by the base station device. The mobile station device determines that power headroom will be transmitted if any of the following events occurs. The first event is that "prohibitPHR-Timer has expired and the value of the path loss has changed dl-PathlossChange [dB] or more from the value of the path loss used for calculation in the previous power headroom transmission". The second event is that "periodicPHR-Timer has expired". The third event is "the configuration or reconfiguration of the power headroom transmission functionality". In this manner, a process for determining whether or not to transmit the power headroom and sending a power headroom report to a base station device is referred to as power headroom reporting.

The mobile station device determines that power headroom will be transmitted, and transmits an uplink signal including information concerning the power headroom to the base station device upon allocation of resources to be used for the transmission of the uplink signal by the base station device. Upon transmitting the information concerning the power headroom, the mobile station device once resets the periodicPHR-Timer timer and the prohibitPHR-Timer timer that are in measurement mode, and restarts the periodicPHR-Timer timer and the prohibitPHR-Timer timer.

CITATION LIST

Non Patent Literature

NPL 1: 3GPP TSG RAN1 #66, Athens, Greece, 22-26, Aug. 2011, R1-112523 "UL PC for Networks with Geographically Distributed RRHs"

SUMMARY OF INVENTION

Technical Problem

However, related art technologies regarding the power headroom are based on only the case where one type of path loss is estimated from one type of reference signal and the estimated type of path loss is used for the transmit power of the uplink signal. For example, how power headroom transmissions that use a path loss estimated in accordance with one of a plurality of types of reference signals are controlled is not disclosed in the citation. For example, the citation does not disclose how the transmission of information concerning the power headroom is controlled in a case where a plurality of types of path losses are estimated from a plurality of types of reference signals and a mobile station device transmits uplink signals using the transmit powers calculated from the path losses.

Improper communication of information concerning the power headroom to the base station device may not allow efficient processing such as resource allocation of the uplink signal to a mobile station device and determination of a modulation scheme, causing a problem in that the accuracy of uplink scheduling may degrade. For example, in a communication system capable of dynamic switching of a destination (or destinations) that receives a signal (or receive signals), it is desirable that the path loss suitable for each destination be used to determine the transmit power of the uplink signal and that uplink scheduling for each destination be efficiently performed, in terms of improvement in spectral efficiency. The term "dynamic switching" means, for example, subframe-by-subframe switching.

The present invention has been made in view of the foregoing, and it is an object of the present invention to provide a mobile station device, a communication system, a communication method, and an integrated circuit that may achieve efficient transmission of uplink signals in a communication system including a plurality of mobile station devices and a base station device.

Solution to Problem (1) In order to achieve the object described above, the present invention provides the following solution. A mobile station device of the present invention is a mobile station device for communicating with at least one base station device. The mobile station device includes a first reception processing unit configured to receive a signal from the base station device; a path loss calculation unit configured to calculate path losses, each based on one of a plurality of types of reference signals received by the first reception processing unit; a transmit power setting unit configured to set a desired transmit power for an uplink signal using the path losses calculated by the path loss calculation unit; and a power headroom control unit configured to generate a power headroom using the desired transmit power set by the transmit power setting unit, the power headroom being information concerning transmit power to spare, and configured to control transmission of the power headroom. The power headroom control unit independently controls a power headroom transmission process that uses each of the path losses calculated based on the plurality of types of reference signals, using an independent parameter for each power headroom transmission process.

(2) In the mobile station device of the present invention, furthermore, each of the reference signals is a Cell specific Reference Signal (CRS) or a Channel State Information Reference Signal (CSI-RS).

(3) In the mobile station device of the present invention, furthermore, the plurality of types of reference signals are Channel State Information Reference Signals (CSI-RSs) having different configurations.

(4) In the mobile station device of the present invention, furthermore, the parameter is at least one of periodicPHR-Timer, prohibitPHR-Timer, or dl-PathlossChange.

(5) Furthermore, a mobile station device of the present invention is a mobile station device for communicating with at least one base station device. The mobile station device includes a first reception processing unit configured to receive a signal from the base station device; a path loss calculation unit configured to calculate path losses, each based on one of a plurality of types of reference signals received by the first reception processing unit; a transmit power setting unit configured to set a desired transmit power for an uplink signal using the path losses calculated by the path loss calculation unit; and a power headroom control unit configured to generate a power headroom using the desired transmit power set by the transmit power setting unit, the power headroom being information concerning transmit power to spare, and configured to control transmission of the power headroom. The power headroom control unit uses common dl-PathlossChange for a transmission process for power headrooms that use the path losses calculated based on the plurality of types of reference signals, and performs control to transmit the power headrooms that use the path losses calculated based on the plurality of types of reference signals in a case where an amount by which one of the plurality of path losses calculated by the path loss calculation unit has changed is more than a value of dl-PathlossChange.

(6) Furthermore, a mobile station device of the present invention is a mobile station device for communicating with at least one base station device. The mobile station device includes a first reception processing unit configured to receive a signal from the base station device; a path loss calculation unit configured to calculate path losses, each based on one of a plurality of types of reference signals received by the first reception processing unit; a transmit power setting unit configured to set a desired transmit power for an uplink signal using the path losses calculated by the path loss calculation unit; and a power headroom control unit configured to generate a power headroom using the desired transmit power set by the transmit power setting unit, the power headroom being information concerning transmit power to spare, and configured to control transmission of the power headroom. The power headroom control unit uses dl-PathlossChange for a transmission process for one given power headroom among power headrooms that use the path losses calculated based on the plurality of types of reference signals, and performs control to transmit the power headrooms that use the path losses calculated based on the plurality of types of reference signals in a case where an amount by which a path loss used in the transmission process for the one given power headroom has changed is more than a value of dl-PathlossChange.

(7) Furthermore, a mobile station device of the present invention is a mobile station device for communicating with at least one base station device. The mobile station device includes a first reception processing unit configured to receive a signal from the base station device; a path loss calculation unit configured to calculate path losses, each based on one of a plurality of types of reference signals received by the first reception processing unit; a transmit power setting unit configured to set a desired transmit power for an uplink signal using the path losses calculated by the path loss calculation unit; and a power headroom control unit configured to generate a power headroom using the desired transmit power set by the transmit power setting unit, the power headroom being information concerning transmit power to spare, and configured to control transmission of the power headroom. The power headroom control unit uses common periodicPHR- Timer for a transmission process for power headrooms that use the path losses calculated based on the plurality of types of reference signals, and performs control to transmit the power headrooms that use the path losses calculated based on the plurality of types of reference signals in a case where the periodicPHR-Timer has expired.

(8) Furthermore, a communication system of the present invention is a communication system including a plurality of mobile station devices and at least one base station device configured to communicate with the plurality of mobile station devices. The base station device includes a second transmission processing unit configured to transmit a signal to the mobile station devices, and a second reception processing unit configured to receive a signal from the mobile station devices. Each of the mobile station devices is a mobile station device configured to communicate with a base station device, and includes a first reception processing unit configured to receive a signal from the base station device; a path loss calculation unit configured to calculate path losses, each based on one of a plurality of types of reference signals received by the first reception processing unit; a transmit power setting unit configured to set a desired transmit power for an uplink signal using the path losses calculated by the path loss calculation unit; and a power headroom control unit configured to generate a power headroom using the desired transmit power set by the transmit power setting unit, the power headroom being information concerning transmit power to spare, and configured to control transmission of the power headroom. The power headroom control unit independently controls a power headroom transmission process that uses each of the path losses calculated based on the plurality of types of reference signals, using an independent parameter for each power headroom transmission process.

(9) Furthermore, a communication method of the present invention is a communication method used in a mobile station device communicating with at least one base station device. The communication method includes at least the steps of receiving a signal from the base station device; calculating path losses, each based on one of a plurality of types of reference signals that have been received; setting a desired transmit power for an uplink signal using the calculated path losses; and generating a power headroom using the set desired transmit power, the power headroom being information concerning transmit power to spare, and controlling transmission of the power headroom. Power headroom transmission processes that use the path losses calculated based on the plurality of types of reference signals is independently controlled using an independent parameter for each power headroom transmission process.

(10) Furthermore, an integrated circuit of the present invention is an integrated circuit for causing, while the integrated circuit is mounted in a mobile station device for communicating with at least one base station device, the mobile station device to implement a plurality of functions including receiving a signal from the base station device; calculating path losses, each based on one of a plurality of types of reference signals that have been received; setting a desired transmit power for an uplink signal using the calculated path losses; and generating a power headroom using the set desired transmit power, the power headroom being information concerning transmit power to spare, and controlling transmission of the power headroom. Power headroom transmission processes that use the path losses calculated based on the plurality of types of reference signals is independently controlled using an independent parameter for each power headroom transmission process.

The present invention will be disclosed herein in terms of an improved mobile station device, communication system, communication method, and integrated circuit in a case where a base station device is notified of information related to the transmit power of the mobile station device. However, the communication scheme to which the present invention may be applied is not limited to communication schemes that have forward compatibility with LTE, such as LTE and LTE-A. For example, the present invention may also be applied to UMTS (Universal Mobile Telecommunications System).

Advantageous Effects of Invention

According to this invention, a base station device may efficiently control a mobile station device to transmit an uplink signal.

DESCRIPTION OF EMBODIMENTS

The technologies described herein may be used for a variety of radio communication systems including a code division multiple access (CDMA) system, a time division multiple access (TDMA) system, a frequency division multiple access (FDMA) system, an orthogonal FDMA (OFDMA) system, a single-carrier FDMA (SC-FDMA) system, and any other system. The terms "system" and "network" may sometimes be used interchangeably. The CDMA system may implement radio technologies (standards) such as universal terrestrial radio access (UTRA) or CDMA2000 (registered trademark). UTRA includes wideband CDMA (WCDMA) and other improved versions of CDMA. CDMA2000 covers the IS-2000, IS-95, and IS-856 standards. The TDMA system may implement radio technologies such as Global System for Mobile Communications (GSM (registered trademark)). The OFDMA system may implement radio technologies such as Evolved UTRA (E-UTRA), Ultra Mobile Broadband (UMB), IEEE 802.11 (Wi-Fi), IEEE 802.16 (WiMAX), IEEE 802.20, and Flash-OFDM (registered trademark). UTRA and E-UTRA are part of the universal mobile telecommunications system (UMTS). 3GPP LTE (Long Term Evolution) is UMTS that uses E-UTRA which employs OFDMA in the downlink and employs SC-FDMA in the uplink. LTE-A is a system, radio technology, or standard that is an improved version of LTE. UTRA, E-UTRA, UMTS, LTE, LTE-A, and GSM (registered trademark) are described in documents from an organization named 3rd Generation Partnership Project (3GPP). CDMA2000 and UMB are described in documents from an organization named 3rd Generation Partnership Project 2 (3GPP2). For clarity, certain aspects of the present technology will be described below for data communication using LTE and LTE-A, and LTE and LTE-A terminology will be used in much of the description below.

First Embodiment

A first embodiment of the present invention will be described in detail hereinafter with reference to the drawings. First, an overview of a communication system according to this embodiment, the configuration of a radio frame, and so on will be described with reference to FIG. 8 to FIG. 12. Then, the configuration of the communication system according to this embodiment will be described with reference to FIG. 1 to FIG. 6. Then, the operational process of the communication system according to this embodiment will be described with reference to FIG. 7.

<Overview of Communication System>

Figure 8:
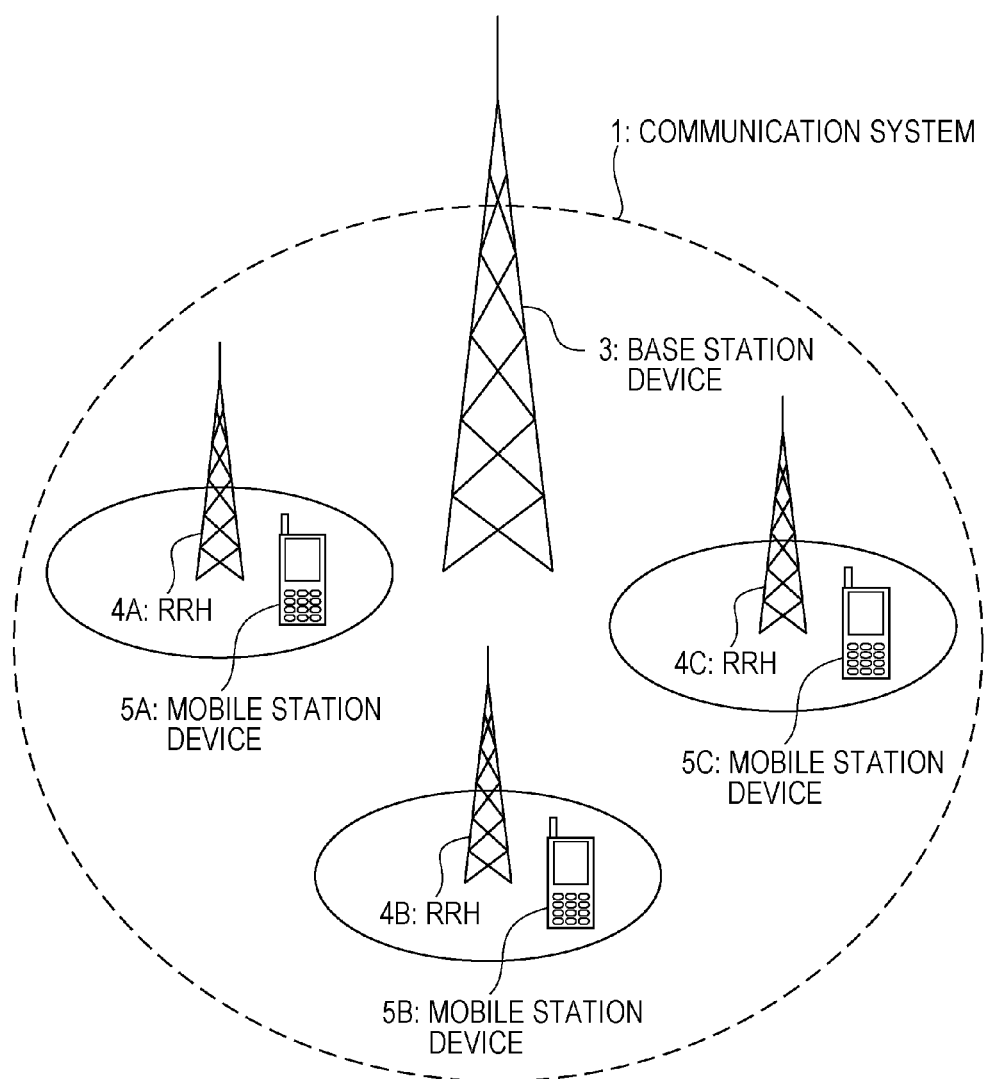
FIG. 8 is a diagram illustrating an overview of a communication system according to the embodiment of the present invention.

FIG. 8 is a diagram schematically illustrating an overview of a communication system according to an embodiment of the present invention. In a communication system 1 illustrated in FIG. 8, a base station device (also referred to as an eNodeB, a NodeB, a BS: Base Station, an AP: Access Point, or a macro base station) 3, a plurality of RRHs (Remote Radio Heads, each of which is a device having an outdoor radio unit smaller than that of a base station device, also referred to as Remote Radio Units: RRUs, also referred to as remote antennas or distributed antennas) 4A, 4B, and 4C, and a plurality of mobile station devices (also referred to as UE: User Equipment, MSs: Mobile Stations, MTs: Mobile Terminals, terminals, terminal devices, or movable terminals) 5A, 5B, and 5C communicate with one another. In the following, in this embodiment, the RRHs 4A, 4B, and 4C are referred to as the RRHs 4 or individually the RRH 4, and the mobile station devices 5A, 5B, and 5C are referred to as the mobile station devices 5 or individually the mobile station device 5, as necessary, for description. In the communication system 1, the base station device 3 and the RRHs 4 coordinate with each other to perform communication with the mobile station devices 5. In FIG. 8, the base station device 3 and the RRH 4A perform coordinated communication with the mobile station device 5A. The base station device 3 and the RRH 4B perform coordinated communication with the mobile station device 5B. The base station device 3 and the RRH 4C perform coordinated communication with the mobile station device 5C. In the communication system 1, furthermore, the plurality of RRHs 4 coordinate with one another to perform communication with the mobile station devices 5. For example, the RRH 4A and the RRH 4B perform coordinated communication with the mobile station device 5A or the mobile station device 5B. The RRH 4B and the RRH 4C perform coordinated communication with the mobile station device 5B or the mobile station device 5C. The RRH 4C and the RRH 4A perform coordinated communication with the mobile station device 5C or the mobile station device 5A.

An RRH may be said to be a special form of a base station device. For example, an RRH may be said to be a base station device which includes only a signal processing unit and for which another base station device configures parameters to be used by the RRH, determines scheduling, and performs other processing. It should be noted that, in the following description, the term "base station device 3" is used to include an RRH 4, as necessary.

<Coordinated Communication>

The communication system 1 according to the embodiment of the present invention may use coordinated communication (Cooperative Multipoint: CoMP communication) in which signals are transmitted and received in a coordinated way using a plurality of cells. For example, a form of base station device that performs communication using an arbitrary frequency band is referred to as a "cell". For example, in coordinated communication, different weighted signal processing (precoding processing) methods are applied to signals in a plurality of cells (the base station device 3 and the RRH 4), and the base station device 3 and the RRH 4 coordinate with each other to transmit the signals to the same mobile station device 5. For example, in coordinated communication, a plurality of cells (the base station device 3 and the RRH 4) coordinate with each other to perform scheduling for the mobile station device 5 (Coordinated Scheduling: CS). For example, in coordinated communication, a plurality of cells (the base station device 3 and the RRH 4) coordinate with each other to apply beamforming to transmit signals to the mobile station device 5 (Coordinated beamforming: CB). For example, in coordinated communication, a signal is transmitted on only one cell (the base station device 3 or the RRH 4) using a certain resource while no signal is transmitted on the other cell (the base station device 3 or the RRH 4) using a certain resource (Blanking, Muting).

Although not described in the embodiment of the present invention, as for a plurality of cells used for coordinated communication, different cells may be configured by different base station devices 3, or different cells may be configured by different RRHs 4 managed by the same base station device 3. Alternatively, different cells may be configured by the base station device 3 and an RRH 4 managed by another base station device 3 different from the base station device 3.

A plurality of cells are physically used as different cells, but may be logically used as the same cell. Specifically, a common cell identifier (physical cell ID) may be used for individual cells. A configuration in which a plurality of transmitters (the base station device 3 and the RRH 4) transmit a common signal to the same receiver using the same frequency is referred to as a single-frequency network (SFN).

A deployment of the communication system 1 of the embodiment of the present invention assumes heterogeneous-network deployments. The communication system 1 includes the base station device 3 and the RRH 4, and is configured such that the coverage supported by the base station device 3 includes part or all of the coverage supported by the RRH 4. The term "coverage", as used herein, refers to an area where communication can be implemented with every request being met. In the communication system 1, the base station device 3 and the RRH 4 coordinate with each other to transmit a signal to the mobile station device 5 located in an overlapped coverage area. The RRH 4 is managed by the base station device 3, and its transmission and reception are controlled. The base station device 3 and the RRH 4 are connected via a wired line such as a fiber optic line or a wireless line that is based on relay technology.

The mobile station device 5 may use single-cell communication with the base station device 3 or the RRH 4 while located near the base station device 3 or the RRH 4. That is, a given mobile station device 5 may communicate with the base station device 3 or the RRH 4 without using coordinated communication, and may transmit and receive signals. For example, the base station device 3 may receive an uplink signal from one of the mobile station devices 5 that is close to the base station device 3. For example, each of the RRHs 4 may receive an uplink signal from one of the mobile station devices 5 that is close to the RRH 4. Furthermore, for example, both the base station device 3 and the RRH 4 may receive an uplink signal from one of the mobile station devices 5 that is located near the edge (cell edge) of the coverage established by the RRH 4. For example, furthermore, each of a plurality of RRHs 4 may receive an uplink signal from one of the mobile station devices 5 that is located near the edge (cell edge) of the coverage established by the RRH 4.

In addition, the mobile station device 5 may receive signals transmitted from both the base station device 3 and the RRH 4 using coordinated communication in the downlink, and may transmit a signal in a form suitable for either the base station device 3 or the RRH 4 in the uplink. For example, the mobile station device 5 transmits an uplink signal at a transmit power suitable for the base station device 3 to receive the signal. For example, the mobile station device 5 transmits an uplink signal at a transmit power suitable for the RRH 4 to receive the signal.

In addition, different frequency bands may be used for the base station device 3 and the RRHs 4, and coordinated communication may be used only between different RRHs 4. For example, the mobile station device 5 transmits an uplink signal at a transmit power suitable for each of the RRHs 4 to receive the signal.

In the communication system 1, downlink (also referred to as DL), which is the communication direction from the base station device 3 or the RRHs 4 to the mobile station devices 5, includes a downlink pilot channel, a physical downlink control channel (also referred to as PDCCH), and a physical downlink shared channel (also referred to as PDSCH). Coordinated communication may or may not be applied to the PDSCH.

In the communication system 1, furthermore, uplink (also referred to as UL), which is the communication direction from the mobile station devices 5 to the base station device 3 or the RRHs 4, includes a physical uplink shared channel (also referred to as PUSCH), an uplink pilot channel (UL RS: Uplink Reference Signal, SRS: Sounding Reference Signal, DM RS: Demodulation Reference Signal), and a physical uplink control channel (also referred to as PUCCH). The term "channel" means a medium used in the transmission of signals. A channel used in the physical layer is referred to as a physical channel, and a channel used in the Medium Access Control (MAC) layer is referred to as a logical channel.

The present invention may also be applied to a communication system in which the mobile station device 5 is controlled in the uplink to transmit a signal at a transmit power suitable for the base station device 3 to receive the signal and to transmit a signal at a transmit power suitable for the RRH 4 to receive the signal, and other operations will not be described herein, except as appropriate, for simplicity of description. However, it should be noted that the present invention is not meant to be limited to the operations described above. For example, the present invention may also be applied to a communication system in which the mobile station device 5 is controlled in the uplink to transmit a signal at an optimum transmit power for the RRH 4 to receive the signal and to transmit a signal at a transmit power that is suboptimal for the base station device 3 to receive the signal.

Furthermore, the embodiment of the present invention is not limited to the communication system 1 in which only the channels described herein are used, and may also be applied to a communication system in which other channels are used. For example, a downlink control channel having characteristics different from those of the PDCCH (E-PDCCH: Enhanced-PDCCH) may be used independently from the PDCCH. For example, precoding processing may be applied to the E-PDCCH. For example, the E-PDCCH may be subjected to demodulation processes, such as channel compensation, based on a reference signal to which processing similar to precoding processing used for the E-PDCCH has been applied.

The PDSCH is a physical channel used for the transmission and reception of downlink data and control information. The PDCCH is a physical channel used for the transmission and reception of downlink control information. The PUSCH is a physical channel used for the transmission and reception of uplink data and control information. The PDCCH is a physical channel used for the transmission and reception of control information on the uplink (uplink control information: UCI). Types of UCI include reception acknowledgement response (ACK/NACK) indicating positive response (Acknowledgement: ACK) or negative response (Negative Acknowledgement: NACK) to downlink data on the PDSCH, and a scheduling request (SR) indicating whether or not to make a request for the allocation of resources. Other types of physical channels include a synchronization channel (SCH, synchronization signal) used for the establishment of downlink synchronization, a physical random access channel (PRACH) used for the establishment of uplink synchronization, and a physical broadcast channel (PBCH) used for the transmission of system information on the downlink (also referred to as SIB: System Information Block). The PDSCH is also used for the transmission of downlink system information.

The mobile station devices 5, the base station device 3, or the RRHs 4 map and transmit signals generated from control information, data, and the like on the respective physical channels. The data transmitted on the PDSCH or PDSCH is referred to as a transport block. The area administered by the base station device 3 or the RRH 4 is referred to as a cell.

<Configuration of Downlink Time Frame>

Figure 9:
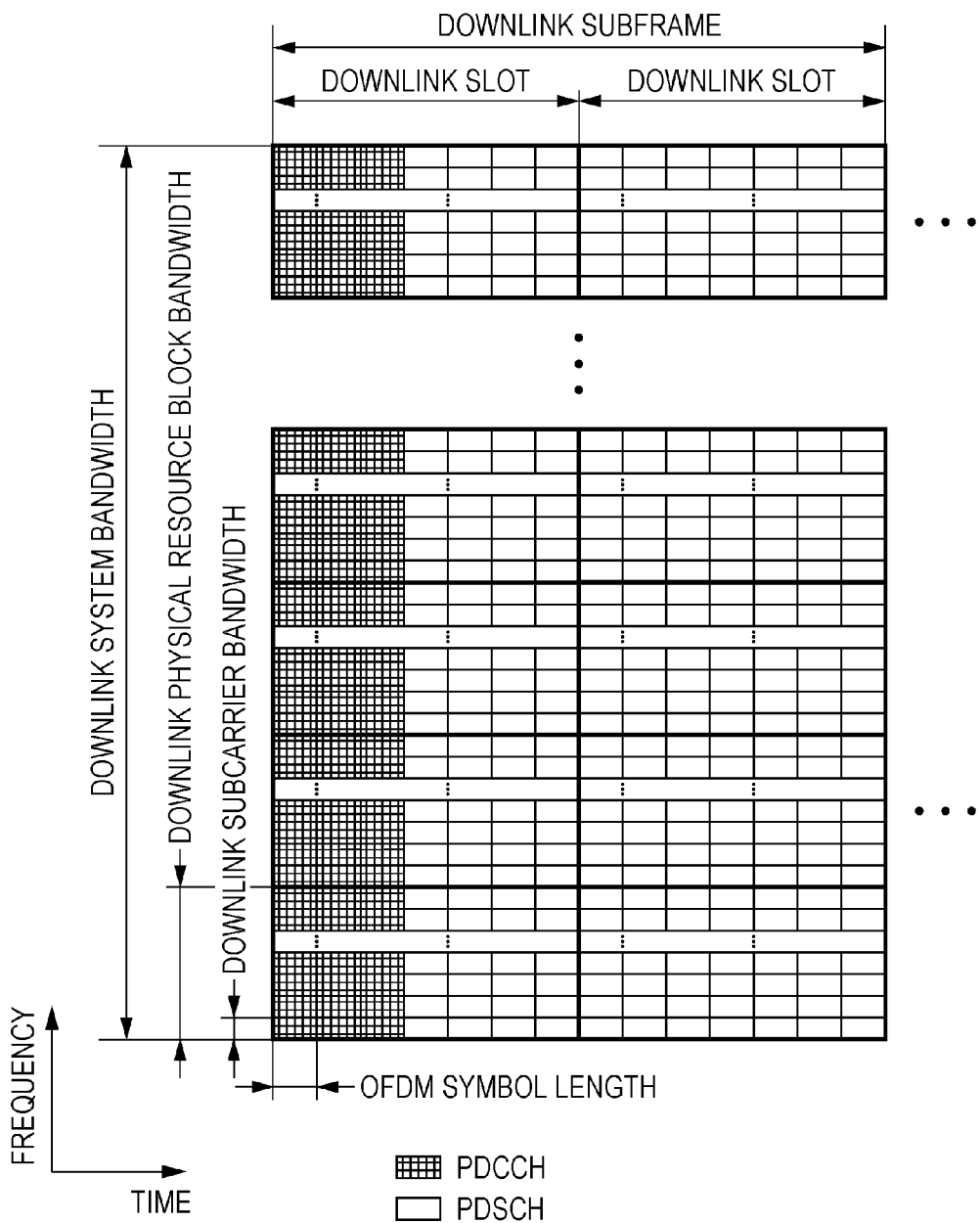
FIG. 9 is a diagram illustrating a schematic configuration of a downlink time frame from the base station device 3 to the mobile station device 5 according to the embodiment of the present invention.

FIG. 9 is a diagram illustrating a schematic configuration of a downlink time frame from the base station device 3 or the RRH 4 to the mobile station device 5 according to an embodiment of the present invention. In FIG. 9, the horizontal axis represents the time domain and the vertical axis represents the frequency domain. The downlink time frame is the unit of resource allocation or the like, and is composed of a pair of resource blocks (RBs) (also referred to as PRBs: Physical Resource Blocks) (referred to as a physical resource block pair; PRB pair) having frequency and time bands of a predetermined width on the downlink. Each PRB pair for the downlink (referred to as a downlink physical resource block pair; DL PRB pair) is composed of two PRBs (referred to as downlink physical resource blocks; DL PRBs) that are continuous in the time domain for the downlink.

In FIG. 9, furthermore, each DL PRB is composed of 12 subcarriers (referred to as downlink subcarriers) in the frequency domain for the downlink, and 7 OFDM (Orthogonal Frequency Division Multiplexing) symbols in the time domain. The system band for the downlink (referred to as the downlink system band) is the downlink communication band of the base station device 3 or the RRH 4. For example, the system bandwidth for the downlink (referred to as the downlink system bandwidth) is formed of a frequency bandwidth of 20 MHz.

In the downlink system band, a plurality of DL PRBs are mapped in accordance with the downlink system bandwidth. For example, the downlink system band with a frequency bandwidth of 20 MHz is composed of 110 DL PRBs.

In the time domain illustrated in FIG. 9, a slot (referred to as a downlink slot) is composed of 7 OFDM symbols, and a subframe (referred to as a downlink subframe) is composed of 2 downlink slots. A unit composed of one downlink subcarrier and one OFDM symbol is referred to as a resource element (RE, downlink resource element). In each downlink subframe, at least the PDSCH used for the transmission of information data (also referred to as a transport block) and the PDCCH used for the transmission of control information are mapped. In FIG. 9, the PDCCH is composed of the first to third OFDM symbols in a downlink subframe, and the PDSCH is composed of the fourth to fourteenth OFDM symbols in the downlink subframe. The number of OFDM symbols forming the PDCCH and the number of OFDM symbols forming the PDSCH may be changed for each downlink subframe.

Although not illustrated in FIG. 9, downlink pilot channels used for the transmission of reference signals (RSs) on the downlink (referred to as downlink reference signals) are distributed and mapped over a plurality of downlink resource elements. The downlink reference signals at least include a first reference signal, a second reference signal, and a third reference signal, where the first reference signal, the second reference signal, and the third reference signal are of different types. The downlink reference signals are used for, for example, the estimation of channel variations for the PDSCH and PDCCH. For example, the first reference signal is used for the demodulation of the PDSCH and PDCCH, and is also referred to as a Cell specific RS (CRS). For example, the second reference signal is used for the demodulation of the PDSCH to which coordinated communication is applied, and is also referred to as a UE specific RS. For example, the third reference signal is used only for the estimation of channel variations, and is also referred to as a Channel State Information RS (CSI-RS). The downlink reference signals are known signals in the communication system 1. The number of downlink resource elements forming the downlink reference signals may depend on the number of transmit antennas (antenna ports) used for the base station device 3 or the RRH 4 to communicate with the mobile station device 5. In the following description, the CRS is used as the first reference signal, the UE specific RS is used as the second reference signal, and the CSI-RS is used as the third reference signal. The UE specific RS may also be used for the demodulation of the PDSCH to which coordinated communication is not applied.

Signals generated from control information are mapped on the PDCCH. The control information includes information indicating the allocation of DL PRBs to the PDSCH, information indicating the allocation of UL PRBs to the PUSCH, and information indicating a mobile station device identifier (referred to as a Radio Network Temporary Identifier: RNTI), a modulation scheme, a coding rate, a retransmission parameter, a spatial multiplexing order, a precoding matrix, and a transmit power control command (TPC command). The control information included in the PDCCH is referred to as downlink control information (DCI). DCI including information indicating the allocation of DL PRBs to the PDSCH is referred to as downlink assignment (DL assignment, or also referred to as downlink grant), and DCI including information indicating the allocation of UL PRBs to the PUSCH is referred to as uplink grant (UL grant). The downlink assignment includes a transmit power control command for PUCCH. The uplink assignment includes a transmit power control command for PUSCH. One PDCCH includes only information indicating the allocation of one PDSCH resource or information indicating the allocation of one PUSCH resource but does not include information indicating the allocation of a plurality of PDSCH resources or information indicating the allocation of a plurality of PUSCH resources.

The information to be transmitted on the PDCCH further includes a cyclic redundancy check (CRC) code. The relationships among DCI, RNTI, and CRC, which are transmitted on the PDCCH, will now be described in detail. A CRC code is generated from the DCI using a predetermined generator polynomial. The generated CRC code is exclusive ORed (also referred to as scrambled) using the RNTI. Bits indicating the DCI and bits (referred to as CRC masked by UE ID) generated by the exclusive OR operation on the CRC code using the RNTI are modulated to obtain a signal, which is actually transmitted on the PDCCH.

In the time domain, the PDSCH resources are mapped in the same downlink subframe as a downlink subframe in which the PDCCH resources including the downlink assignment used for the allocation of the PDSCH resources are mapped.

Figure 10:
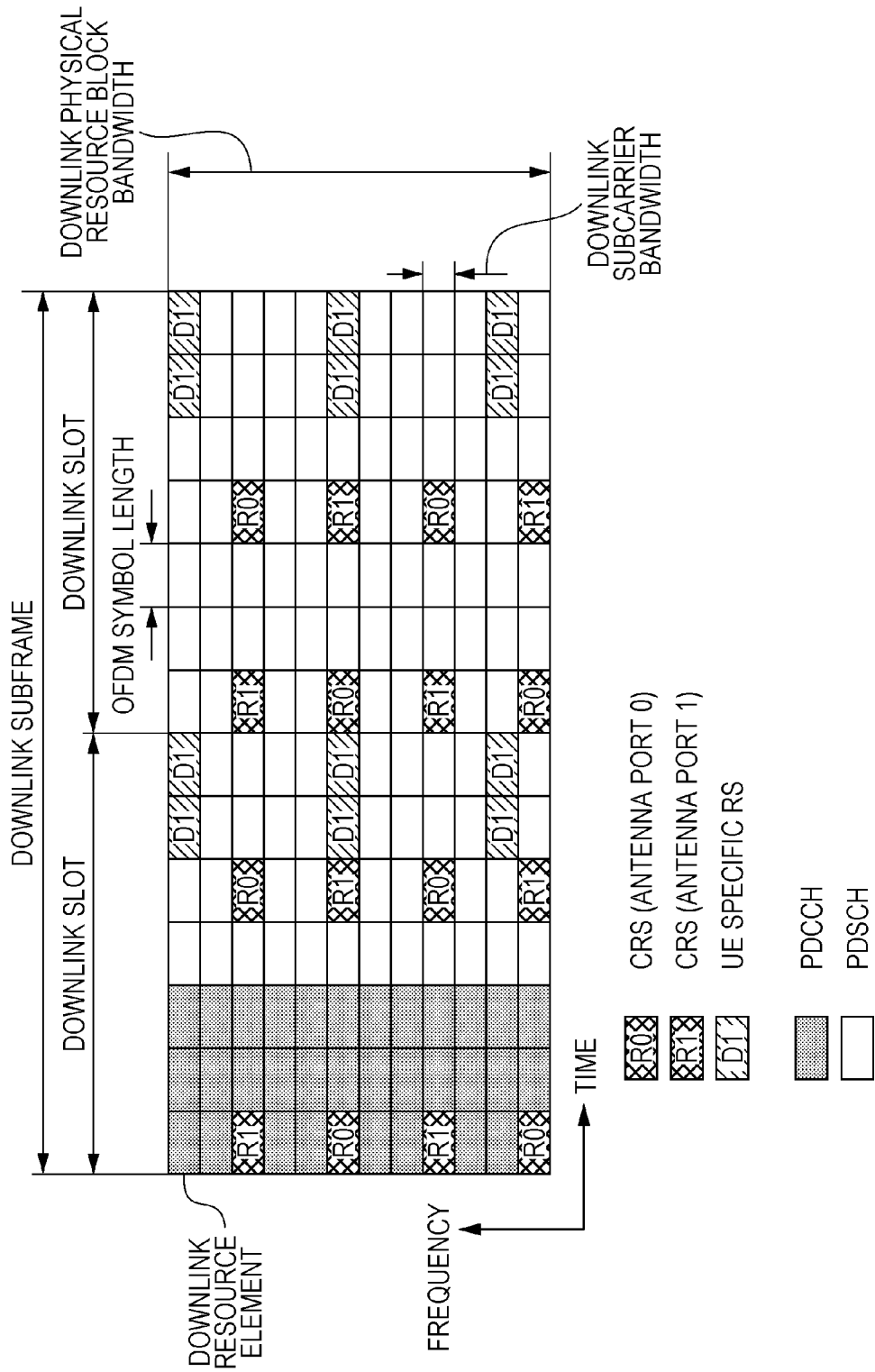
FIG. 10 is a diagram illustrating an example of mapping of downlink reference signals (CRS, UE-specific RS) in a downlink subframe of a communication system 1 according to an embodiment of the present invention.

A description will be given of mapping of the downlink reference signals. FIG. 10 is a diagram illustrating an example of mapping of downlink reference signals in a downlink subframe of the communication system 1 according to an embodiment of the present invention. In FIG. 10, for simplicity of description, a description will be given of mapping of downlink reference signals in one PRB pair. Basically, a common mapping method is used for all PRB pairs in the downlink system band.

Among the downlink resource elements shown shaded, R0 to R1 represent the CRS for antenna ports 0 to 1, respectively. The term "antenna port", as used herein, refers to a logical antenna port used in signal processing. One antenna port may be composed of a plurality of physical antennas. A plurality of physical antennas forming the same antenna port provide transmission of the same signal. While delay diversity or CDD (Cyclic Delay Diversity) can be applied within the same antenna port using a plurality of physical antennas, no other signal processing can be used. In FIG. 10, the CRS for two antenna ports is illustrated. However, the communication system of this embodiment may support a different number of antenna ports. For example, the CRS for one antenna port or four antenna ports may be mapped to downlink resources. The CRS is mapped in all the DL PRBs within the downlink system band.

Among the downlink resource elements shaded with oblique lines, D1 represents UE specific RS. In a case where the UE specific RS is to be transmitted using a plurality of antenna ports, a different code is used for each antenna port. That is, CDM (Code Division Multiplexing) is applied to the UE specific RS. The length of codes used for CDM or the number of downlink resource elements to which the UE specific RS is to be mapped may be changed in accordance with the types of signal processing (the number of antenna ports) used for the control signals or data signals mapped in the PRB pair. For example, in a case where two antenna ports are used in the base station device 3 and the RRH 4 for coordinated communication, the UE specific RS is multiplexed and mapped using codes having a length of two symbols in units (CDM units) of two downlink resource elements in the time domain (OFDM symbols) that are contiguous in the same frequency domain (subcarrier). In other words, in this case, CDM is applied to the multiplexing of the UE specific RS. For example, in a case where four antenna ports are used in the base station device 3 and the RRH 4 for coordinated communication, the number of downlink resource elements to which the UE specific RS is mapped is changed to twice the original, and the UE specific RS is multiplexed and mapped to different downlink resource elements for every two antenna ports. In other words, in this case, CDM and FDM (Frequency Division Multiplexing) are applied to the multiplexing of the UE specific RS. For example, in a case where eight antenna ports are used in the base station device 3 and the RRH 4 for coordinated communication, the number of downlink resource elements to which the UE specific RS is mapped is changed to twice the original, and the UE specific RS is multiplexed and mapped using codes having a length of four symbols in units of four downlink resource elements. In other words, in this case, CDM with different code lengths is applied to the multiplexing of the UE specific RS.

In the UE specific RS, a scrambling code is further superimposed on a code for each antenna port. The scrambling code is generated in accordance with a cell ID and a scrambling ID that are notified by the base station device 3 or the RRH 4. For example, a scrambling code is generated from a pseudo-noise sequence generated in accordance with a cell ID and a scrambling ID that are notified by the base station device 3 or the RRH 4. The scrambling ID is, for example, a value indicating 0 or 1. The scrambling ID and antenna port to be used may be jointly coded, and information indicating them may be indexed. The UE specific RS is mapped in the DL PRBs on the PDSCH allocated to the mobile station device 5 configured with the use of the UE specific RS.

Each of the base station device 3 and the RRH 4 may allocate CRS signals to different downlink resource elements, or may allocate CRS signals to the same downlink resource element. For example, each of the base station device 3 and the RRH 4 may allocate CRS signals to different resource elements and/or different signal sequences. In this case, the mobile station device 5 can individually compute each received power (received signal power, reception quality) using the CRS. The configuration described above is made possible particularly when the cell ID notified by the base station device 3 is different from the cell ID notified by the RRH 4. In another example, only the base station device 3 may allocate CRS signals to some of the downlink resource elements, and the RRH 4 may allocate CRS signals to none of the downlink resource elements. In this case, the mobile station device 5 can compute the received power of the base station device 3 from the CRS. The configuration described above is made possible particularly in a case where only the base station device 3 notifies the mobile station device 5 of a cell ID. In another example, the base station device 3 and the RRH 4 may allocate CRS signals to the same downlink resource element, and the same sequence may be transmitted from the base station device 3 and the RRH 4. In this case, the mobile station device 5 can compute combined received power using the CRS. The configuration described above is made possible particularly in a case where the cell ID notified by the base station device 3 is the same as the cell ID notified by the RRH 4.

In the description of the embodiment of the present invention, for example, the computation of power includes the computation of a power value, and the calculation of power includes the calculation of a power value. In addition, the measurement of power includes the measurement of a power value, and the reporting of power includes the reporting of a power value. In this manner, the term "power" includes the meaning of a power value, as necessary.

Figure 11:
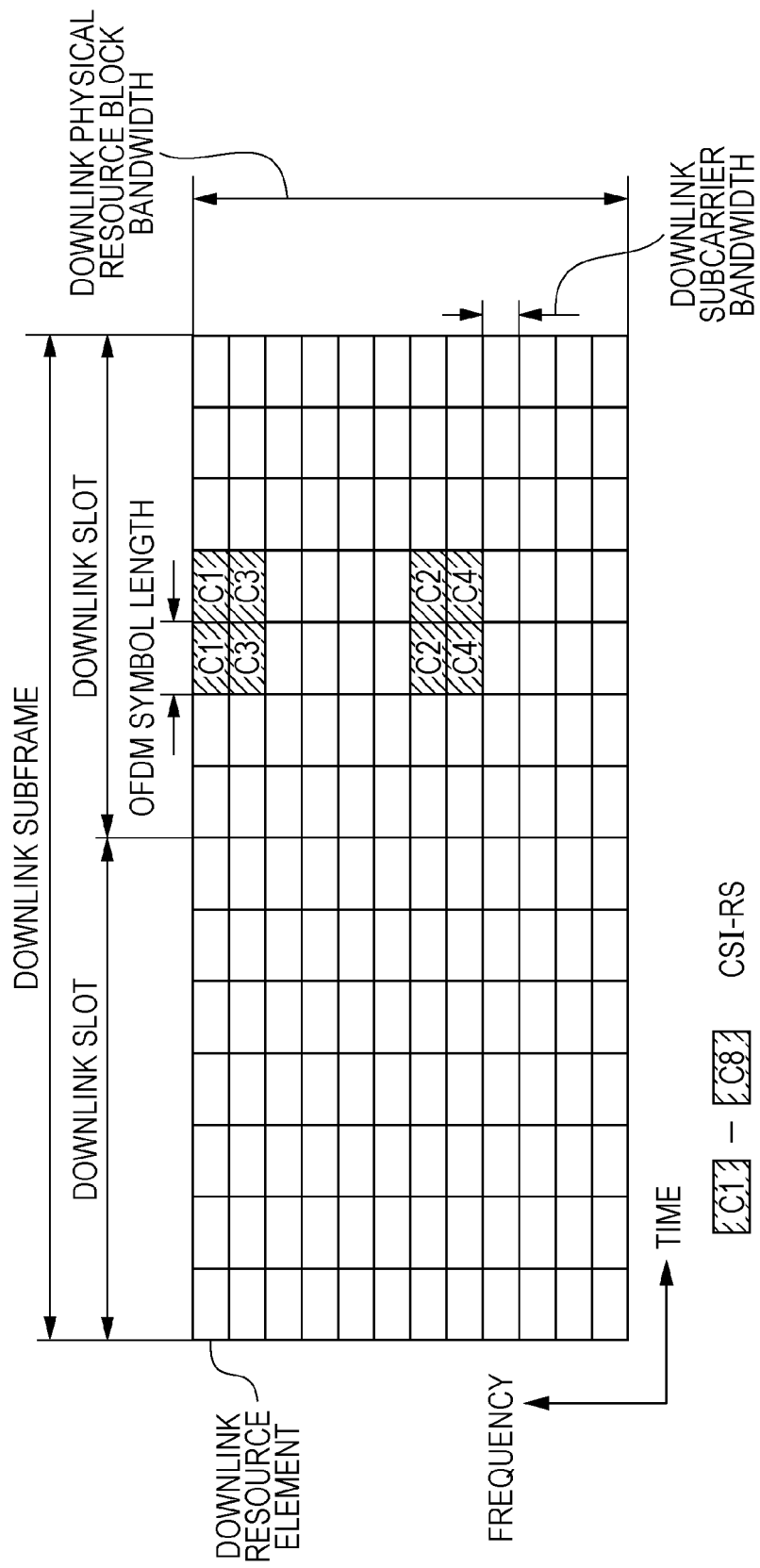
FIG. 11 is a diagram illustrating an example of mapping of downlink reference signals (CSI-RS) in a downlink subframe of the communication system 1 according to the embodiment of the present invention.

FIG. 11 is a diagram illustrating a DL PRB pair to which the CSI-RS (channel-state information reference signal) for eight antenna ports has been mapped. FIG. 11 depicts mapping of the CSI-RS when the number of antenna ports (the number of CSI ports) used in the base station device 3 and the RRH 4 is 8. In FIG. 11, the illustration of CRS, UE specific RS, PDCCH, PDSCH, and the like is omitted for simplicity of illustration.

In each CDM group, the CSI-RS is implemented using 2-chip orthogonal codes (Walsh codes), and each orthogonal code is allocated a CSI port (a port for the CSI-RS (antenna port, resource grid)). Code division multiplexing is performed every two CSI ports. In addition, each CDM group is frequency-division multiplexed. The 8-antenna-port CSI-RS for CSI ports 1 to 8 (antenna ports 15 to 22) is mapped using four CDM groups. For example, in the CDM group C1 of the CSI-RS, the CSI-RS for CSI ports 1 and 2 (antenna ports 15 and 16) is code-division multiplexed and mapped. In the CDM group C2 of the CSI-RS, the CSI-RS for CSI ports 3 and 4 (antenna ports 17 and 18) is code-division multiplexed and mapped. In the CDM group C3 of the CSI-RS, the CSI-RS for CSI ports 5 and 6 (antenna ports 19 and 20) is code-division multiplexed and mapped. In the CDM group C4 of the CSI-RS, the CSI-RS for CSI ports 7 and 8 (antenna ports 21 and 22) is code-division multiplexed and mapped.

If the number of antenna ports of the base station device 3 and the RRH 4 is 8, the base station device 3 and the RRH 4 can configure up to eight layers (ranks, spatial multiplexing layers) to be applied to the PDSCH. In addition, the base station device 3 and the RRH 4 can transmit the CSI-RS in a case where the number of antenna ports is 1, 2, or 4. The base station device 3 and the RRH 4 can transmit the CSI-RS for one antenna port or two antenna ports using the CDM group C1 of the CSI-RS illustrated in FIG. 11. The base station device 3 and the RRH 4 can transmit the CSI-RS for four antenna ports using the CDM groups C1 and C2 of the CSI-RS illustrated in FIG. 11.

The base station device 3 and the RRH 4 may allocate CSI-RS signals to different downlink resource elements, or may allocate CSI-RS signals to the same downlink resource element. For example, the base station device 3 and the RRH 4 may allocate different downlink resource elements and/or different signal sequences to the CSI-RS. In this case, the mobile station device 5 can individually compute each received power (received signal power, reception quality) and each channel state of the base station device 3 and the RRH 4 using the CSI-RS. In another example, the base station device 3 and the RRH 4 may allocate the same downlink resource element to the CSI-RS, and the same sequence may be transmitted from the base station device 3 and the RRH 4. In this case, the mobile station device 5 can compute combined received power using the CSI-RS. In some cases, each of different RRHs 4 may allocate CSI-RS signals to different downlink resource elements. For example, each of different RRHs 4 may allocate different downlink resource elements and/or different signal sequences to the CSI-RS. In this case, the mobile station device 5 can individually compute each received power (received signal power, reception quality) and each channel state of the different RRHs 4 using the CSI-RS.

The mobile station device 5 is notified of a CSI-RS configuration (CSI-RS-Config-r10) by the base station device 3 or the RRH 4. The CSI-RS configuration at least includes information (antennaPortsCount-r10) indicating the number of antenna ports configured for the CSI-RS, information (subframeConfig-r10) indicating the downlink subframe in which the CSI-RS is mapped, and information (resourceConfig-r10) indicating the frequency domain in which the CSI-RS is mapped. The number of antenna ports is equal to any of, for example, 1, 2, 4, and 8. The information indicating the frequency domain in which the CSI-RS is mapped includes an index indicating the position of the first resource element among the resource elements in which the CSI-RS corresponding to antenna port 15 (CSI port 1) is mapped. Once the position of the CSI-RS corresponding to antenna port 15 is determined, the CSI-RS corresponding to the other antenna ports is uniquely determined in accordance with a predetermined rule. As the information indicating the downlink subframe in which the CSI-RS is mapped, the position and interval of the downlink subframe in which the CSI-RS is mapped are indicated by indices. For example, subframeConfig-r10 with the index 5 indicates that the CSI-RS is mapped every ten subframes and that the CSI-RS is mapped in subframe 0 in a radio frame (the number of a subframe in a radio frame) having ten subframes as a unit. In another example, for example, subframeConfig-r10 with the index 1 indicates that the CSI-RS is mapped every five subframes, and that the CSI-RS is mapped in subframes 1 and 6 in a radio frame having ten subframes as a unit.

The embodiment of the present invention mainly assumes that the CSI-RS corresponding to at least a specific antenna port is transmitted only from the RRH 4. This assumption includes the case where the CSI-RS corresponding to all the antenna ports for the CSI-RS is transmitted only from the RRH 4. In a case where the CSI-RS corresponding to some of the antenna ports is transmitted only from the RRH 4, the CSI-RS corresponding to the other antenna ports may be transmitted only from the base station device 3, or may be transmitted from both the base station device 3 and the RRH 4 (SFN transmission). The CRS may be transmitted only from the base station device 3, or may be transmitted from both the base station device 3 and the RRH 4 (SFN transmission).

As the details will be described below, the mobile station device 5 receives the CSI-RS for a specific antenna port that is transmitted only from the RRH 4, measures the path loss for the RRH 4, and uses the measured path loss for the setting of the transmit power of the uplink signal. Accordingly, the transmit power suitable for the RRH 4 as the destination of the signal may be set. In addition, the mobile station device 5 may receive the RS (CRS or CSI-RS) transmitted only from the base station device 3, measure the path loss for the base station device 3, and use the measured path loss for the setting of the transmit power of the uplink signal. Accordingly, the transmit power suitable for the base station device 3 as the destination of the signal may be set. Furthermore, the mobile station device 5 may receive the RS (CRS or CSI-RS) transmitted from both the base station device 3 and the RRH 4, measure a path loss from a signal obtained by combining the signals, and use the measured path loss for the setting of the transmit power of the uplink signal. Accordingly, transmit power that is suitable to some extent for the base station device 3 or the RRH 4 as the destination of the signal may be set. In this manner, the setting of the transmit power suitable for the destination of a signal may reduce interference to other signals and may increase the efficiency of the communication system while satisfying the required signal quality. As described above, the embodiment of the present invention mainly assumes a communication system in which the mobile station device 5 measures a plurality of path losses from different types of downlink reference signals and controls the transmit power of the uplink signal using any one of the path losses or using the individual path losses.

The mobile station device 5 is notified of the information concerning antenna ports for the CSI-RS to be transmitted only from the RRH 4. The mobile station device 5 can measure the path loss for the signal to be transmitted from the RRH 4 in accordance with the notified information. In the following description, basically, the CRS is transmitted only from the base station device 3 and the CSI-RS is transmitted only from the RRH 4, for simplicity of description. In the following description, therefore, the path loss measured based on the CRS is meant to indicate that for a signal to be transmitted from the base station device 3, and the path loss measured based on the CSI-RS is meant to indicate that for a signal to be transmitted from the RRH 4. Such a communication system is used for the purpose of describing the embodiment of the present invention only, for simplicity of description, and the following description does not limit the present invention. The present invention may also be applied to a communication system in which the CRS is transmitted from both the base station device 3 and the RRH 4, a communication system in which only the CSI-RS for a specific antenna port is transmitted from the RRH 4, and so on.

The mobile station device 5 is notified of information concerning the transmit power for the CRS and the transmit power for the CSI-RS by the base station device 3 or the RRH 4 using RRC signaling. As the details will be described below, the mobile station device 5 measures (calculates) a path loss from various types of downlink reference signals using the notified transmit powers of the various types of downlink reference signals.

A different CSI-RS configuration may be applied to each of different RRHs 4. For example, in different configurations of the CSI-RS for different RRHs 4, the downlink subframes in which the CSI-RS is mapped may differ. For example, in different configurations of the CSI-RS for different RRHs 4, the frequency domains in which the CSI-RS is mapped may differ. For example, in different configurations of the CSI-RS for different RRHs 4, the numbers of antenna ports for the CSI-RS may differ. The mobile station device 5 is notified of information concerning the respective configurations of the CSI-RS for the RRHs 4 to which coordinated communication is applied, by the base station device 3 using RRC signaling. In accordance with the notified configurations of the CSI-RS, the mobile station device 5 receives the CSI-RSs transmitted from the RRHs 4, measures the path losses for the RRHs 4, and sets the measured path losses in the transmit powers of uplink signals. Accordingly, the mobile station device 5 can configure the transmit power suitable for each of the RRHs 4 serving as the destinations of the signals. In this manner, the setting of the transmit powers suitable for the destinations of signals may reduce interference to other signals and may increase the efficiency of the communication system while satisfying the required signal quality. As described above, the present invention may be applied to a communication system in which the mobile station device 5 measures a plurality of path losses from different types of downlink reference signals and controls the transmit power of the uplink signal using any one of the path losses or using the individual path losses. More specifically, the mobile station device 5 may measure a plurality of path losses from a plurality of CSI-RSs having different CSI-RS configurations, and control the transmit power of the uplink signal using any one of the path losses or using the individual path losses.

<Configuration of Uplink Time Frame>

Figure 12:
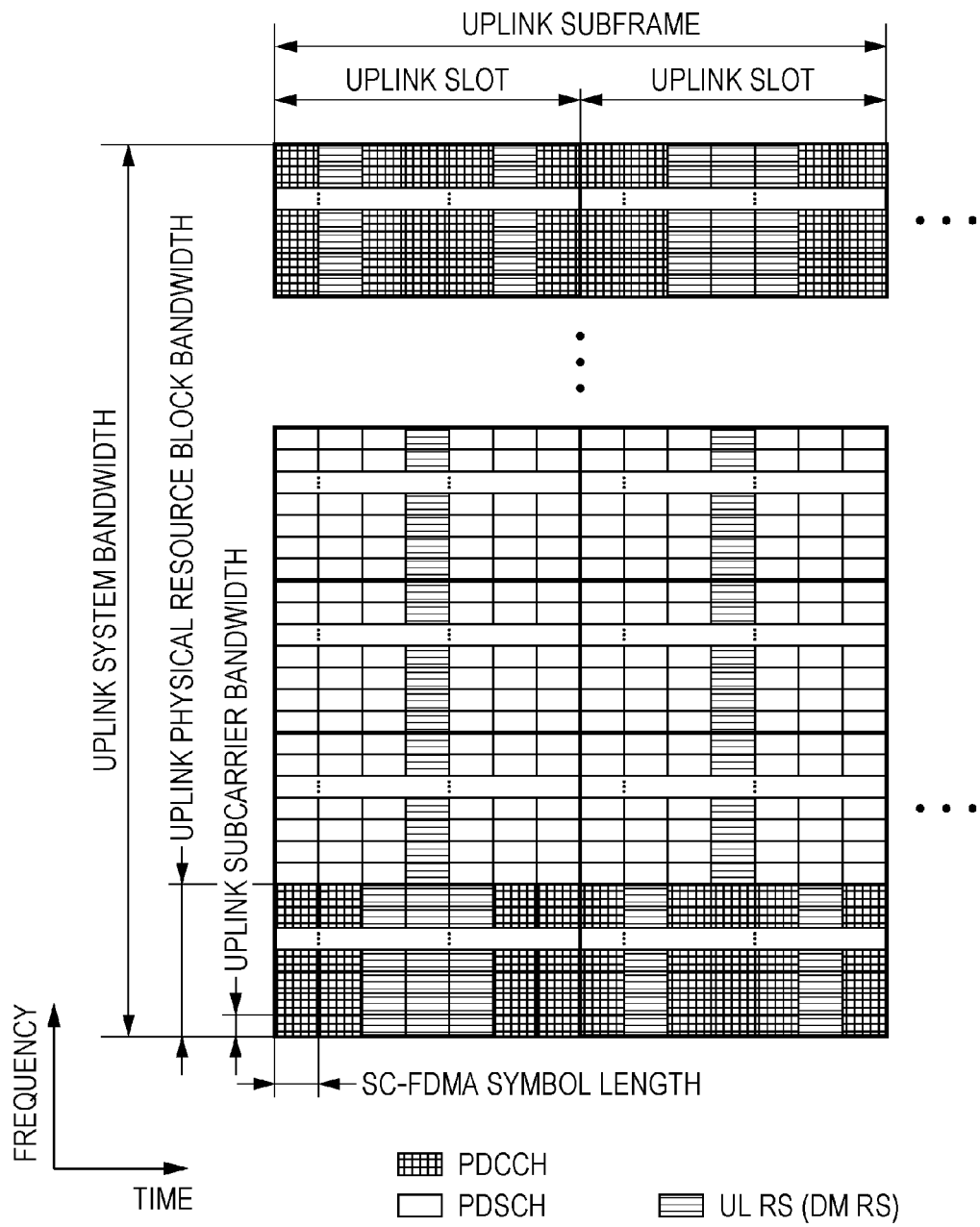
FIG. 12 is a diagram illustrating a schematic configuration of an uplink time frame from the mobile station device 5 to the base station device 3 according to the embodiment of the present invention.

FIG. 12 is a diagram illustrating a schematic configuration of an uplink time frame from the mobile station device 5 to the base station device 3 or the RRH 4 according to an embodiment of the present invention. In FIG. 12, the horizontal axis represents the time domain and the vertical axis represents the frequency domain. The uplink time frame is the unit of resource allocation or the like, and is composed of a pair of physical resource blocks (referred to as an uplink physical resource block pair; UL PRB pair) having frequency and time bands of a predetermined width on the uplink. Each UL PRB pair is composed of two uplink PRBs (referred to as uplink physical resource blocks; UL PRBs) that are continuous in the time domain for the uplink.

In FIG. 12, furthermore, each UL PRB is composed of 12 subcarriers (referred to as uplink subcarriers) in the frequency domain for the uplink, and 7 SC-FDMA (Single-Carrier Frequency Division Multiple Access) symbols in the time domain. The system band for the uplink (referred to as the uplink system band) is the uplink communication band of the base station device 3 or the RRH 4. For example, the system bandwidth for the uplink (referred to as the uplink system bandwidth) is formed of a frequency bandwidth of 20 MHz.

In the uplink system band, a plurality of UL PRBs are mapped in accordance with the uplink system bandwidth. For example, the uplink system band with a frequency bandwidth of 20 MHz is composed of 110 UL PRBs. In the time domain illustrated in FIG. 12, a slot (referred to as an uplink slot) is composed of 7 SC-FDMA symbols, and a subframe (referred to as an uplink subframe) is composed of 2 uplink slots. A unit composed of one uplink subcarrier and one SC-FDMA symbol is referred to as a resource element (uplink resource element).

In each uplink subframe, at least the PUSCH used for the transmission of information data, the PUCCH used for the transmission of uplink control information (UCI), and the UL RS (DMRS) for the demodulation of the PUSCH and PUCCH (the estimation of channel variations) are mapped. Although not illustrated in FIG. 12, the PRACH used for the establishment of uplink synchronization is mapped in any uplink subframe. In addition, although not illustrated in FIG. 12, the UL RS (SRS) used for the measurement of channel quality and an out-of-sync and the like is mapped in any uplink subframe. The PUCCH is used to transmit UCI (ACK/NACK) indicating a positive response (ACK: Acknowledgement) or a negative response (NACK: Negative Acknowledgement) to data received using the PDSCH, UCI (SR: Scheduling Request) at least indicating whether or not to make a request for the allocation of uplink resources, and UCI (CQI: Channel Quality Indicator) indicating the reception quality (also referred to as channel quality) in the downlink.

In order to inform the base station device 3 of a request for the allocation of uplink resources, the mobile station device 5 transmits a signal on a PUCCH for SR transmission. The base station device 3 recognizes that the mobile station device 5 is requesting the allocation of uplink resources, in accordance with the result of a signal having been detected on the PUCCH resources for SR transmission. In order to inform the base station device 3 that no request for the allocation of uplink resources will be made, the mobile station device 5 transmits no signal using pre-allocated PUCCH resources for SR transmission. The base station device 3 recognizes that the mobile station device 5 is not requesting the allocation of uplink resources, in accordance with the result of no signal having been detected on the PUCCH resources for SR transmission.

In addition, PUCCHs having different signal configurations are used for the transmission of the UCI including ACK/NACK, the transmission of the UCI including SR, and the transmission of the UCI including CQI. The PUCCH used for the transmission of ACK/NACK is referred to as PUCCH format 1a or PUCCH format 1b. In PUCCH format 1a, BPSK (Binary Phase Shift Keying) is used as a modulation scheme by which information concerning ACK/NACK is modulated. In PUCCH format 1a, 1-bit information is obtained from a modulation signal. In PUCCH format 1b, QPSK (Quadrature Phase Shift Keying) is used as a modulation scheme by which information concerning ACK/NACK is modulated. In PUCCH format 1b, 2-bit information is obtained from a modulation signal. The PUCCH used for SR transmission is referred to as PUCCH format 1. The PUCCH used for CQI transmission is referred to as PUCCH format 2. The PUCCH used for the simultaneous transmission of CQI and ACK/NACK is referred to as PUCCH format 2a or PUCCH format 2b. In PUCCH format 2b, the reference signal (DM RS) of the uplink pilot channel is multiplied by the modulation signal generated from the information on ACK/NACK. In PUCCH format 2a, 1-bit information concerning ACK/NACK and information on CQI are transmitted. In PUCCH format 2b, 2-bit information concerning ACK/NACK and information on CQI are transmitted.

One PUSCH is composed of one or more UL PRBs, and one PUCCH is composed of two UL PRBs located in different uplink slots. The two UL PRBs are symmetric to each other in the frequency domain within the uplink system band. One PRACH is composed of six UL PRB pairs. For example, in FIG. 12, in the uplink subframe, one UL PRB pair used for PUCCH is composed of the UL PRB having the lowest frequency in the first uplink slot and the UL PRB having the highest frequency in the second uplink slot. The mobile station device 5 may be configured not to simultaneously perform PUSCH transmission and PUCCH transmission. In this case, if PUCCH resources and PUSCH resources are allocated in the same uplink subframe, the mobile station device 5 transmits a signal only using the PUSCH resources. The mobile station devices 5 may be configured to simultaneously perform PUSCH transmission and PUCCH transmission. In this case, if PUCCH resources and PUSCH resources are allocated in the same uplink subframe, the mobile station devices 5 can basically transmit a signal using both the PUCCH resources and the PUSCH resources.

The UL RS is a signal used for the uplink pilot channel. The UL RS is composed of a demodulation reference signal (DM RS) used for the estimation of channel variations for the PUSCH and PUCCH, and a sounding reference signal (SRS) used for channel quality measurement for frequency scheduling of PUSCH and adaptive modulation for the base station device 3 or the RRH 4 and used for the measurement of an out-of-sync condition between the base station device 3 and the mobile station device 5 or between the RRH 4 and the mobile station device 5. The DM RS is mapped to different SC-FDMA symbols depending on whether the DM RS is mapped in the same UL PRB as the PUSCH or is mapped in the same UL PRB as the PUCCH. The DM RS is used for the estimation of channel variations for the PUSCH and PUCCH, and is a known signal in the communication system 1.

If the DM RS is mapped in the same UL PRB as the PUSCH, the DM RS is mapped to the fourth SC-FDMA symbol in the uplink slot. If the DM RS is mapped in the same UL PRB as the PUCCH including ACK/NACK, the DM RS is mapped to the third, fourth, and fifth SC-FDMA symbols in the uplink slot. If the DM RS is mapped in the same UL PRB as the PUCCH including SR, the DM RS is mapped to the third, fourth, and fifth SC-FDMA symbols in the uplink slot. If the DM RS is mapped in the same UL PRB as the PUCCH including CQI, the DM RS is mapped to the second and sixth SC-FDMA symbols in the uplink slot.

The SRS is mapped in the UL PRB determined by the base station device 3, and is mapped to the fourteenth SC-FDMA symbol in the uplink subframe (the seventh SC-FDMA symbol in the second uplink slot in the uplink subframe). The SRS may be mapped only in an uplink subframe (referred to as a sounding reference signal subframe; SRS subframe) having the interval determined by the base station device 3 within the cell. The base station device 3 allocates, for each of the mobile station devices 5, the interval over which the SRS is transmitted to the SRS subframe, and the UL PRB to be allocated to the SRS to the SRS subframe.

In FIG. 12, mapping of the PUCCH to the UL PRBs at the edges of the frequency domain of the uplink system band is illustrated. However, UL PRBs such as the second or third UL PRBs from the edges of the uplink system band may be used for the PUCCH.

In the PUCCH, code multiplexing in the frequency domain and code multiplexing in the time domain are used. Code multiplexing in the frequency domain is processed by multiplying each code in the code sequence by the modulation signal modulated from the uplink control information in units of subcarriers. Code multiplexing in the time domain is processed by multiplying each code in the code sequence by the modulation signal modulated from the uplink control information in units of SC-FDMA symbols. A plurality of PUCCHs are mapped in the same UL PRB, and each PUCCH is assigned a different code. The assigned codes enable code multiplexing in the frequency domain or the time domain. In the PUCCH (referred to as PUCCH format 1a or PUCCH format 1b) used for the transmission of ACK/NACK, code multiplexing in the frequency domain and the time domain is used. In the PUCCH (referred to as PUCCH format 1) used for SR transmission, code multiplexing in the frequency domain and the time domain is used. In the PUCCH (referred to as PUCCH format 2, PUCCH format 2a, or PUCCH format 2b) used for CQI transmission, code multiplexing in the frequency domain is used. For simplicity of description, a description of code multiplexing of PUCCHs will be omitted as necessary.

In the time domain, PUSCH resources are mapped in an uplink subframe located a certain number (for example, 4) from the downlink subframe in which PUCCH resources including the uplink grant which has been used for the allocation of the PUSCH resources are mapped.

<Additional Measurement of Path Loss on the Basis of CSI-RS>

The mobile station device 5 calculates (measures) a path loss on the basis of the CRS. The mobile station device 5 additionally calculates (measures) a path loss on the basis of the CSI-RS. The mobile station device 5 calculates uplink transmit power in accordance with the calculated path losses, and transmits an uplink signal at the uplink transmit power having the calculated value. The base station device 3 configures the mobile station device 5 with the (configuration of) parameters related to the measurement of downlink reference signals. In the initial state (default state), the mobile station device 5 calculates a path loss on the basis of the CRS, and calculates the uplink transmit power value using the calculated path loss. In the initial state, the mobile station device 5 calculates a path loss on the basis of the CRS for antenna port 0 or the CRS for antenna ports 0 and 1.

The base station device 3 configures the mobile station device 5 so that the mobile station device 5 additionally calculates a path loss on the basis of the CSI-RS and the calculated path loss can be used for the calculation of the uplink transmit power if determined necessary (for example, if it is determined that the mobile station device 5 is close to the RRH 4). Specifically, the base station device 3 adds or modifies (resets, reconfigures) a path loss reference for the mobile station device 5. The path loss reference is modified using, for example, RRC signaling. The path loss reference is a measurement object to be used for path loss calculation, and is CRS or CSI-RS. The base station device 3 can specify an antenna port for the CSI-RS that the mobile station device 5 uses for path loss calculation. The mobile station device 5 calculates a path loss on the basis of the CSI-RS for the antenna port specified by the base station device 3. Here, the base station device 3 may specify one or a plurality of antenna ports or all the antenna ports for the mobile station device 5. The base station device 3 controls the mobile station device 5 to transmit an uplink signal at the transmit power calculated using the path loss measured in accordance with the CRS. The base station device 3 controls the mobile station device 5 to transmit an uplink signal at the transmit power calculated using the path loss measured in accordance with the CSI-RS. Furthermore, the base station device 3 configures the mobile station device 5 so as to stop the measurement of the path loss on the basis of the CSI-RS, if determined necessary. This operation may be performed while the mobile station device 5 is calculating a path loss on the basis of the CSI-RS.

Calculation of the path loss requires the value of the transmit power of the downlink reference signals. Accordingly, the base station device 3 notifies the mobile station device 5 of information concerning the CRS transmit power value and information concerning the CSI-RS transmit power value.

If the cell constructed by the base station device 3 and the cell constructed by the RRH 4 are in different frequency bands, only the CSI-RS may be configured, but the CRS may not be configured, in the cell constructed by the RRH 4. For example, in this case, the mobile station device 5 may not necessarily set, as the initial state (default state), a process for calculating a path loss on the basis of the CRS and calculating an uplink transmit power value using the calculated path loss for the cell constructed by the RRH 4. Instead, the mobile station device 5 may set, as the initial state (default state), a process for calculating a path loss on the basis of the CSI-RS and calculating an uplink transmit power value using the calculated path loss. If the base station device 3 determines that an additional RRH 4 to be used for coordinated communication is necessary for the mobile station device 5, the base station device 5 notifies the mobile station device 5 of the CSI-RS configuration for the cell constructed by the RRH 4, and adds or modifies (resets, reconfigures) the path loss reference for the mobile station device 5.

<Power Headroom Reporting>

Power headroom reporting is a procedure for providing the base station device 3 or the RRH 4 with information concerning the difference (power headroom) between the nominal UE maximum transmit power and the PUSCH estimated transmit power. As the processing layer, the RRC (Radio Resource Control) controls power headroom reporting, configures two timers (periodicPHR-Timer and prohibitPHR-Timer) for control, and signals a certain parameter (dl-PathlossChange). A series of processes for determining whether or not to transmit the power headroom is referred to as a power headroom transmission process. A power headroom transmission process is independently executed (controlled) for each path loss reference.

dl-PathlossChange is a parameter for triggering a power headroom transmission if the value of the path loss has changed. The amount of change between the path loss measured last time the power headroom was transmitted and the path loss measured at the current time is used for the threshold determination with respect to dl-PathlossChange. As a result of threshold determination using dl-PathlossChange, if the amount of change of the measured path loss exceeds the value of dl-PathlossChange, a power headroom transmission is triggered. The value of dl-PathlossChange is represented in dB, and is equal to any of, for example, 1 dB, 3 dB, 6 dB, and infinity.

periodicPHR-Timer is a timer used to trigger a power headroom transmission periodically to some extent. When periodicPHR-Timer expires, a power headroom transmission is triggered. When the power headroom is transmitted, periodicPHR-Timer that is in measurement mode is reset once and restarted. The value of periodicPHR-Timer is represented in number of subframes as a unit, and is equal to any of, for example, 10 subframes, 20 subframes, 50 subframes, 100 subframes, 200 subframes, 500 subframes, 1000 subframes, and infinity.

prohibitPHR-Timer is a timer used to prevent power headroom transmissions from being triggered more frequently than necessary. Even if the amount of change of the measured path loss exceeds the value of dl-PathlossChange in a period during which prohibitPHR-Timer does not expire and is in measurement mode, a power headroom transmission is not triggered. If prohibitPHR-Timer has expired, a power headroom transmission may be triggered by dl-PathlossChange. When the power headroom is transmitted, prohibitPHR-Timer that is in measurement mode is reset once and restarted. The value of prohibitPHR-Timer is represented in number of subframe as a unit, and is equal to any of, for example, 0 subframes, 10 subframes, 20 subframes, 50 subframes, 100 subframes, 200 subframes, 500 subframes, and 1000 subframes.

The base station device 3 or the RRH 4 notifies the mobile station device 5 of the parameters periodicPHR-Timer, prohibitPHR-Timer, and dl-PathlossChange using a RRC signaling structure called phr-Config. Upon initial setting of phr-Config (configuration of power headroom reporting functionality) or reconfiguration of phr-Config (reconfiguration of power headroom reporting functionality), a power headroom transmission is triggered.

The value of the power headroom is equal to the difference between the transmit power value pre-configured in the mobile station device 5 and the desired PUSCH transmit power value. The desired PUSCH transmit power value is calculated using parameters used for transmit power control in accordance with a predetermined formula (algorithm). For example, the desired PUSCH transmit power value is set so that the required quality is satisfied. The transmit power value at which the PUSCH is actually transmitted is the smaller one of the transmit power value pre-configured in the mobile station device 5 and the desired PUSCH transmit power value as a result of comparison therebetween. The transmit power value pre-configured in the mobile station device 5 is equal to a transmit power value that the base station device 3 or the RRH 4 has set in advance for the mobile station device 5 or is equal to the upper limit value of the allowable transmit power as the device capability of the mobile station device 5. For example, the device capability corresponds to power amplifier class. The value of the power headroom is represented in steps of 1 dB within the range of [40; −23] dB.

If a downlink reference signal used for path loss measurement (calculation, estimation) is additionally set (configured, modified, reset, reconfigured, or re-modified) by the base station device 3 or the RRH 4, the mobile station device 5 becomes available to transmit the power headroom. The state of being available to transmit the power headroom can also be said to be a state where a power headroom transmission has been triggered. Upon allocation of PUSCH resources for new transmission, except for retransmission, by the base station device 3 or the RRH 4, the mobile station device 5 that is available to transmit the power headroom transmits a signal including power headroom information using the PUSCH to which the resources have been allocated. The value of the power headroom is basically based on the transmit power value configured for the PUSCH used for power headroom transmission. More precisely, the desired PUSCH transmit power value described above is used for the calculation of the power headroom. If the desired PUSCH transmit power value described above is smaller than the transmit power value pre-configured in the mobile station device 5, the PUSCH transmit power value used for power headroom transmission is set to be equal to the desired PUSCH transmit power value. If the desired PUSCH transmit power value described above is larger than the transmit power value pre-configured in the mobile station device 5, the PUSCH transmit power value used for power headroom transmission is set to be equal to the transmit power value pre-configured in the mobile station device 5. The object to be used for path loss measurement is referred to as the path loss reference (Pathlossreference). The path loss used for the calculation of the uplink transmit power value is calculated from the configured path loss reference. That is, the value of the power headroom is calculated in accordance with the path loss calculated from the configured path loss reference.

The mobile station device 5 becomes available to transmit the power headroom in response to, for example, switching from the state of path loss measurement based on the CRS to the state of path loss measurement based on the CRS and also based on the CSI-RS. Here, the mobile station device 5 becomes available to transmit the power headroom that is based on the path loss measured from at least the CSI-RS. The mobile station device 5 may become available to transmit the power headroom that is also based on the path loss measured from the CRS. For example, the mobile station device 5 becomes available to transmit the power headroom in response to the additional configuration of a process for path loss measurement based on the CRS in a state where the mobile station device 5 is performing only a process for path loss measurement based on the CSI-RS. Here, the mobile station device 5 becomes available to transmit the power headroom that is based on the path loss measured from at least the CRS. The mobile station device 5 may become available to transmit the power headroom that is further based on the path loss measured from the CSI-RS.

For example, the mobile station device 5 becomes available to transmit the power headroom in response to the additional configuration of, in a state where the mobile station device 5 measures a path loss based on a CSI-RS with a given CSI-RS configuration, a process for path loss measurement based on a CSI-RS with a different CSI-RS configuration. Here, the mobile station device 5 becomes available to transmit the power headroom that is based on the path loss measured from at least the added CSI-RS with the CSI-RS configuration. The mobile station device 5 may become available to transmit the power headroom that is also based on the path loss measured from the CSI-RS with the originally configured CSI-RS configuration.

The mobile station device 5 may also become available to transmit the power headroom in response to the setting (configuration) in which some of the downlink reference signals used for path loss measurement (calculation, estimation) are deleted by the base station device 3 or the RRH 4. For example, the mobile station device 5 may become available to transmit the power headroom in response to switching from the state of path loss measurement based on the CRS and also based on the CSI-RS to the state of path loss measurement based only on the CRS. Here, the mobile station device 5 is available to transmit the power headroom that is based on the path loss measured from the CRS.

In a communication system in which a path loss reference may be additionally configured in the mobile station device 5, the mobile station device 5 becomes available to transmit the power headroom in response to the additional configuration of a path loss reference. The term "additional configuration of path loss reference" refers to the additional configuration of an object to be used for path loss measurement (a downlink reference signal). For example, the mobile station device 5 simultaneously and in parallel performs a process for path loss measurement based on the CRS and a process for path loss measurement based on the CSI-RS. In response to the additional configuration of a path loss reference, the mobile station device 5 becomes available to transmit the power headroom that is based on the path loss measured from at least the added path loss reference.

In a communication system in which a path loss reference may be additionally configured in the mobile station device 5, the mobile station device 5 becomes available to transmit the power headroom in response to the additional configuration of a path loss reference. The term "additional configuration of path loss reference" refers to the additional configuration of an object to be used for path loss measurement (a downlink reference signal). For example, the mobile station device 5 simultaneously and in parallel performs a process for path loss measurement based on a CSI-RS with a given CSI-RS configuration and a process for path loss measurement based on a CSI-RS with a different CSI-RS configuration. In response to the additional configuration of a path loss reference, the mobile station device 5 becomes available to transmit the power headroom that is based on the path loss measured from at least the added path loss reference.

A mobile station device 5 in which a plurality of different path loss references are simultaneously configurable may be configured to measure different types of path losses, to hold the values of the measured path losses, and to switch the path losses to be used for PUSCH in units of uplink subframes. For example, which path loss reference the path loss used for PUSCH is based on is indicated by PDCCH information. For example, which path loss reference the path loss used for PUSCH is based on is specified in accordance with the channel (PDCCH or E-PDCCH) used for the transmission of the uplink grant. For example, which uplink subframe and which path loss reference the path loss used for PUSCH is based on are specified in advance. For example, which path loss reference the path loss used for PUSCH is based on is specified on the basis of the downlink subframe in which the PDCCH including the uplink grant is mapped. Here, the relationships between the numbers of the downlink subframes and the corresponding types of path loss references are configured in advance.

A mobile station device 5 available to transmit the power headroom transmits, in response to the allocation of PUSCH resources for new transmission that uses path loss based on the path loss reference corresponding to the power headroom available for transmission, a signal including information on the power headroom available for transmission, by using the PUSCH to which the resources have been allocated. The mobile station device 5 does not execute a process for transmitting the power headroom available for transmission even if PUSCH resources for new transmission that uses path loss based on a path loss reference not corresponding to the power headroom available for transmission is allocated.

The details of power headroom reporting of the first embodiment will be described. A mobile station device 5 in which a plurality of different path loss references are simultaneously configurable is configured with a plurality of parameters related to power headroom reporting. For example, one periodicPHR-Timer timer, one prohibitPHR-Timer timer, and one dl-PathlossChange parameter may be configured for each of the plurality of path losses references. For example, a plurality of periodicPHR-Timer timers are configured. For example, a plurality of prohibitPHR-Timer timers are configured. For example, a plurality of dl-PathlossChange parameters are configured. The mobile station device 5 independently performs a power headroom reporting process for the power headroom that is based on a path loss measured from a different path loss reference. The power headroom reporting process is performed independently for each path loss reference. For example, if a plurality of periodicPHR-Timer timers are configured, the determination of whether or not to reset and restart a periodicPHR-Timer timer is based on whether or not the power headroom calculated from the path loss reference corresponding to the periodicPHR-Timer timer has been transmitted. For example, if a plurality of periodicPHR-Timer timers are configured, the power headroom whose transmission is triggered in response to the expiry of a periodicPHR-Timer timer is the power headroom calculated from the path loss reference corresponding to the periodicPHR-Timer timer. For example, if a plurality of prohibitPHR-Timer timers are configured, the determination of whether or not to reset and restart a prohibitPHR-Timer timer is based on whether or not the power headroom calculated from the path loss reference corresponding to the prohibitPHR-Timer timer has been transmitted. For example, if a plurality of prohibitPHR-Timer timers are configured, the power headroom whose transmission is prohibited while a prohibitPHR-Timer timer is in operation is the power headroom calculated from the path loss reference corresponding to the prohibitPHR-Timer timer. For example, if a plurality of dl-PathlossChange parameters are configured, threshold determination of the difference between dl-PathlossChange and the amount of change of path loss is performed on the path loss measured from the path loss reference corresponding to the dl-PathlossChange parameter.

For example, a description will be given of simultaneous configuration of CRS and CSI-RS as path loss references. periodicPHR-Timer corresponding to the CRS is represented by periodicPHR-Timer 1, and periodicPHR-Timer corresponding to the CSI-RS is represented by periodicPHR-Timer 3. prohibitPHR-Timer corresponding to the CRS is represented by prohibitPHR-Timer 1, and prohibitPHR-Timer corresponding to the CSI-RS is represented by prohibitPHR-Timer 3. dl-PathlossChange corresponding to the CRS is represented by dl-PathlossChange 1, and dl-PathlossChange corresponding to the CSI-RS is represented by dl-PathlossChange 3. If the power headroom based on the CRS is transmitted, periodicPHR-Timer 1, prohibitPHR-Timer 1, and dl-PathlossChange 1 that are in measurement mode are reset (restart). If the power headroom based on the CSI-RS is transmitted, periodicPHR-Timer 3, prohibitPHR-Timer 3, and dl-PathlossChange 3 that are in measurement mode are reset (restart). When periodicPHR-Timer 1 expires, the power headroom based on the CRS becomes available for transmission. When periodicPHR-Timer 3 expires, the power headroom based on the CSI-RS becomes available for transmission. While prohibitPHR-Timer 1 is in measurement mode (before the expiry of the timer), the transmission of the power headroom based on the CRS is disabled. While prohibitPHR-Timer 3 is in measurement mode, the transmission of the power headroom based on the CSI-RS is disabled. dl-PathlossChange 1 is used for threshold determination of the difference between dl-PathlossChange 1 and the amount of change of the path loss measured from the CRS. If the amount of change of the path loss measured from the CRS is larger than the value of dl-PathlossChange 1, the power headroom based on the CRS becomes available for transmission. dl-PathlossChange 3 is used for threshold determination of the difference between dl-PathlossChange 3 and the amount of change of the path loss measured from the CSI-RS. If the amount of change of the path loss measured from the CSI-RS is larger than the value of dl-PathlossChange 3, the power headroom based on the CSI-RS becomes available for transmission.

For example, a description will be given of simultaneous configuration of CSI-RSs with a plurality of CSI-RS configurations (a first CSI-RS configuration and a second CSI-RS configuration) as path loss references. periodicPHR-Timer corresponding to the CSI-RS with the first CSI-RS configuration is represented by periodicPHR-Timer 1, and periodicPHR-Timer corresponding to the CSI-RS with the second CSI-RS configuration is represented by periodicPHR-Timer 3. prohibitPHR-Timer corresponding to the CSI-RS with the first CSI-RS configuration is represented by prohibitPHR-Timer 1, and prohibitPHR-Timer corresponding to the CSI-RS with the second CSI-RS configuration is represented by prohibitPHR-Timer 3. dl-PathlossChange corresponding to the CSI-RS with the first CSI-RS configuration is represented by dl-PathlossChange 1, and dl-PathlossChange corresponding to the CSI-RS with the second CSI-RS configuration is represented by dl-PathlossChange 3. If the power headroom based on the CSI-RS with the first CSI-RS configuration is transmitted, periodicPHR-Timer 1, prohibitPHR-Timer 1, and dl-PathlossChange 1 that are in measurement mode are reset (restart). If the power headroom based on the CSI-RS with the second CSI-RS configuration is transmitted, periodicPHR-Timer 3, prohibitPHR-Timer 3, and dl-PathlossChange 3 that are in measurement mode are reset (restart). When periodicPHR-Timer 1 expires, the power headroom based on the CSI-RS with the first CSI-RS configuration becomes available for transmission. When periodicPHR-Timer 3 expires, the power headroom based on the CSI-RS with the second CSI-RS configuration becomes available for transmission. While prohibitPHR-Timer 1 is in measurement mode (before the expiry of the timer), the transmission of the power headroom based on the CSI-RS with the first CSI-RS configuration is disabled. While prohibitPHR-Timer 3 is in measurement mode, the transmission of the power headroom based on the CSI-RS with the second CSI-RS configuration is disabled. dl-PathlossChange 1 is used for threshold determination of the difference between dl-PathlossChange 1 and the amount of change of the path loss measured from the CSI-RS with the first CSI-RS configuration. If the amount of change of the path loss measured from the CSI-RS with the first CSI-RS configuration is larger than the value of dl-PathlossChange 1, the power headroom based on the CSI-RS with the first CSI-RS configuration becomes available for transmission. dl-PathlossChange 3 is used for threshold determination of the difference between dl-PathlossChange 3 and the amount of change of the path loss measured from the CSI-RS with the second CSI-RS configuration. If the amount of change of the path loss measured from the CSI-RS with the second CSI-RS configuration is larger than the value of dl-PathlossChange 3, the power headroom based on the CSI-RS with the second CSI-RS configuration becomes available for transmission.

<Overall Configuration of Base Station Device 3>

Figure 1:
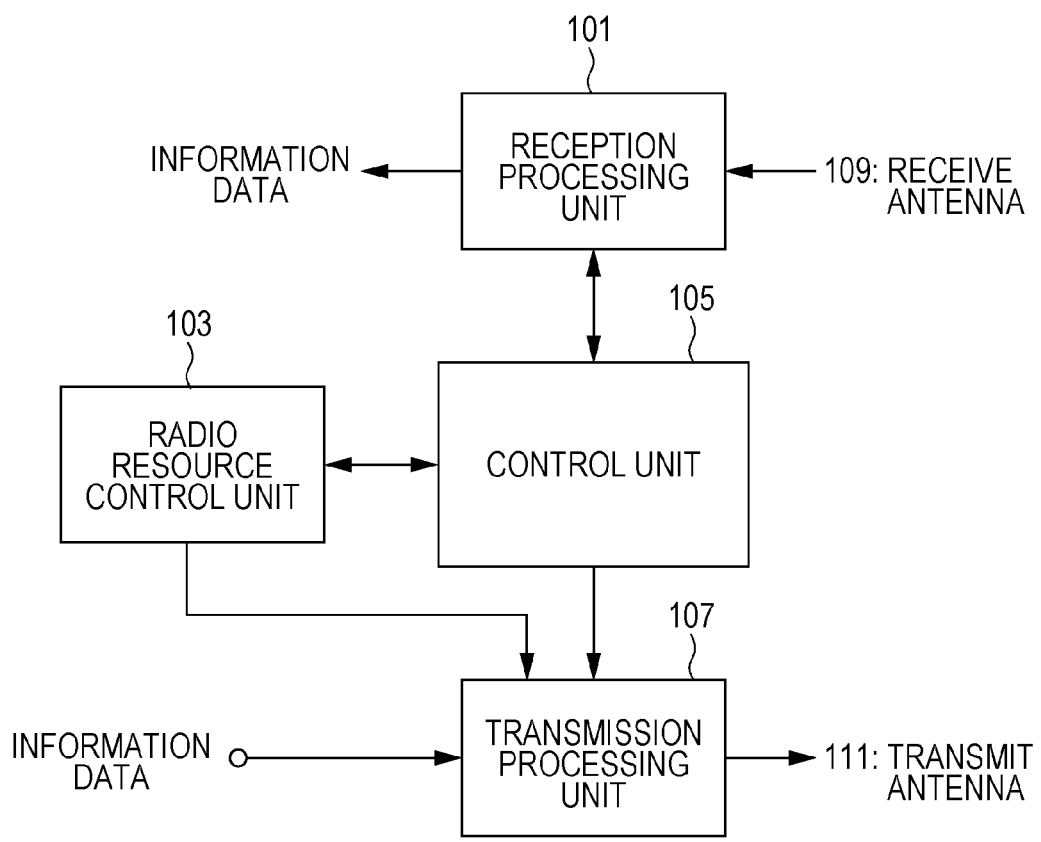
FIG. 1 is a schematic block diagram illustrating a configuration of a base station device 3 according to an embodiment of the present invention.

A configuration of the base station device 3 according to this embodiment will be described hereinafter with reference to FIG. 1, FIG. 2, and FIG. 3. FIG. 1 is a schematic block diagram illustrating a configuration of the base station device 3 according to an embodiment of the present invention. As illustrated in FIG. 1, the base station device 3 includes a reception processing unit (second reception processing unit) 101, a radio resource control unit (second radio resource control unit) 103, a control unit (second control unit) 105, and a transmission processing unit (second transmission processing unit) 107.

In accordance with an instruction from the control unit 105, the reception processing unit 101 demodulates and decodes the received signals for PUCCH and PUSCH which are received from a mobile station device 5 through a receive antenna 109 using the UL RS, and extracts control information and information data. For example, the reception processing unit 101 extracts power headroom information from the PUSCH. The reception processing unit 101 performs a process for extracting UCI from an UL PRB in an uplink subframe in which the base station device 3 has allocated PUCCH resources to the mobile station device 5. The reception processing unit 101 is instructed by the control unit 105 about what process to perform, and which uplink subframe and which UL PRB to use. For example, the reception processing unit 101 is instructed by the control unit 105 to perform a detection process including multiplication of signals for the ACK/NACK PUCCH (PUCCH format 1a, PUCCH format 1b) by the code sequence in the time domain and combination of the results, and multiplication of signals for the ACK/NACK PUCCH (PUCCH format 1a, PUCCH format 1b) by the code sequence in the frequency domain and combination of the results. The reception processing unit 101 is also instructed by the control unit 105 about the frequency domain code sequence and/or time domain code sequence that are used for the process for detection of UCI from the PUCCH. The reception processing unit 101 outputs the extracted UCI to the control unit 105, and outputs the information data to higher layers. The reception processing unit 101 outputs the extracted UCI to the control unit 105, and outputs the information data to higher layers.

Further, in accordance with an instruction from the control unit 105, the reception processing unit 101 detects (receives) a preamble sequence from the received signal for PRACH which is received from the mobile station device 5 through the receive antenna 109. In addition to the detection of a preamble sequence, the reception processing unit 101 also estimates the arrival timing (reception timing). The reception processing unit 101 performs a process for detecting a preamble sequence from an UL PRB in an uplink subframe in which the base station device 3 has been allocated PRACH resources. The reception processing unit 101 outputs information concerning the estimated arrival timing to the control unit 105.

Furthermore, the reception processing unit 101 measures the channel quality of one or more ULPRBs using the SRS received from the mobile station device 5. The reception processing unit 101 further detects (computes, measures) an uplink out-of-sync condition using the SRS received from the mobile station device 5. The reception processing unit 101 is instructed by the control unit 105 about what process to perform, and which uplink subframe and which UL PRB to use. The reception processing unit 101 outputs information concerning the measured channel quality and the detected uplink out-of-sync condition to the control unit 105. The details of the reception processing unit 101 will be described below.

The radio resource control unit 103 sets a CSI-RS configuration, the allocation of resources for PDCCH, the allocation of resources for PUCCH, the allocation of DL PRBs for PDSCH, the allocation of UL PRBs for PUSCH, the allocation of resources for PRACH, the allocation of resources for SRS, and values for various channels, such as modulation schemes, coding rates, transmit power control values, and amounts of phase rotation (weighted values) used for precoding processing. The radio resource control unit 103 further sets parameters related to power headroom reporting (periodicPHR-Timer, prohibitPHR-Timer, and dl-Pathloss-Change). The radio resource control unit 103 further sets the mobile station device 5 with downlink reference signals (CRS and CSI-RS) used for path loss measurement. The radio resource control unit 103 also sets a frequency domain code sequence, a time domain code sequence, and the like for PUCCH. The radio resource control unit 103 outputs information indicating the allocation of the set resources for PUCCH and the like to the control unit 105. The mobile station device 5 is notified of part of the information configured by the radio resource control unit 103 through the transmission processing unit 107. For example, the mobile station device 5 is notified of the information concerning the CSI-RS configuration, the information indicating the values of the parameters related to power headroom reporting, the information indicating the values of some of the parameters related to the transmit power for PUSCH, and information indicating the values of some of the parameters related to the transmit power for PUCCH.

Furthermore, the radio resource control unit 103 sets the allocation of radio resources for PDSCH, and so on in accordance with the UCI acquired using the PUCCH by the reception processing unit 101 and input through the control unit 105. For example, upon input of ACK/NACK which is acquired using the PDCCH, the radio resource control unit 103 allocates, to the mobile station device 5, the PDSCH resources in which a NACK out of ACK/NACK is transmitted.

The radio resource control unit 103 outputs various control signals to the control unit 105. The control signals include, for example, a control signal indicating the allocation of PUSCH resources, and a control signal indicating the amount of phase rotation to be used for precoding processing.

In accordance with the control signals input from the radio resource control unit 103, the control unit 105 controls the transmission processing unit 107 to perform the operations including the setting of CSI-RS, the allocation of DL PRBs for PDSCH, the allocation of resources for PDCCH, the setting of modulation schemes for PDSCH, the setting of coding rates for PDSCH and PDCCH, and the setting of precoding processing for PDSCH and UE specific RS. Further, the control unit 105 generates a DCI to be transmitted using the PDCCH, in accordance with the control signals input from the radio resource control unit 103, and outputs the generated DCI to the transmission processing unit 107. The DCI to be transmitted using the PDCCH includes a downlink assignment, an uplink grant, and so on.

In accordance with the control signals input from the radio resource control unit 103, the control unit 105 controls the reception processing unit 101 to perform the operations including the allocation of UL PRBs for PUSCH, the allocation of resources for PUCCH, the setting of modulation schemes for PUSCH and PUCCH, the setting of coding rates for PUSCH, the detection process for PUCCH, the setting of code sequences for PUCCH, the allocation of resources for PRACH, and the allocation of resources for SRS. Further, the control unit 105 receives an input of the UCI, which is transmitted from the mobile station device 5 using the PUCCH, from the reception processing unit 101, and outputs the input UCI to the radio resource control unit 103.

The control unit 105 further receives an input of the information indicating the arrival timing of the detected preamble sequence, the information indicating the uplink out-of-sync condition detected from the received SRS, from the reception processing unit 101, and computes an adjustment value for the uplink transmission timing (TA: Timing Advance, Timing Adjustment, Timing Alignment) (TA value). The mobile station device 5 is notified of information (TA command) indicating the computed adjustment value for the uplink transmission timing through the transmission processing unit 107.

The transmission processing unit 107 generates signals to be transmitted using the PDCCH and PDSCH, in accordance with the control signals input from the control unit 105, and transmits the generated signals through a transmit antenna 111. The transmission processing unit 107 transmits the following information input from the radio resource control unit 103 to the mobile station device 5 using the PDSCH: the information concerning the CSI-RS configuration, the information indicating the parameters related to power headroom reporting (periodicPHR-Timer, prohibitPHR-Timer, and dl-PathlossChange), the information indicating downlink reference signals (CRS and CSI-RS) used for path loss measurement, the information indicating the values of some of the parameters related to the transmit power for PUSCH, the information indicating the values of some of the parameters related to the transmit power for PUCCH, the information data input from higher layers, and so on. The transmission processing unit 107 further transmits the DCI input from the control unit 105 to the mobile station device 5 using the PDCCH. For simplicity of description, hereinafter, it is assumed that the information data includes information concerning several types of control operations. The details of the transmission processing unit 107 will be described below.

<Configuration of Transmission Processing Unit 107 of Base Station Device 3>

The details of the transmission processing unit 107 of the base station device 3 will be described hereinafter. FIG. 2 is a schematic block diagram illustrating a configuration of the transmission processing unit 107 of the base station device 3 according to an embodiment of the present invention. As illustrated in FIG. 2, the transmission processing unit 107 includes a plurality of physical downlink shared channel processing units 201-1 to 201-M (the physical downlink shared channel processing units 201-1 to 201-M are hereinafter referred to as the physical downlink shared channel processing units 201 or individually the physical downlink shared channel processing unit 201), a plurality of physical downlink control channel processing units 203-1 to 203-M (the physical downlink control channel processing units 203-1 to 203-M are hereinafter referred to as the physical downlink control channel processing units 203 or individually the physical downlink control channel processing unit 203), a downlink pilot channel processing unit 205, a precoding processing unit 231, a multiplexing unit 207, an IFFT (Inverse Fast Fourier Transform) unit 209, a GI (Guard Interval) insertion unit 211, a D/A (Digital/Analog converter) unit 213, a transmit RF (Radio Frequency) unit 215, and the transmit antenna 111. Since the physical downlink shared channel processing units 201 have similar configurations and functions, one of the physical downlink shared channel processing units 201 will be described as a representative. Since the physical downlink control channel processing units 203 have similar configurations and functions, one of the physical downlink control channel processing units 203 will be described as a representative. For simplicity of description, the transmit antenna 111 includes a plurality of antenna ports.

Figure 2:
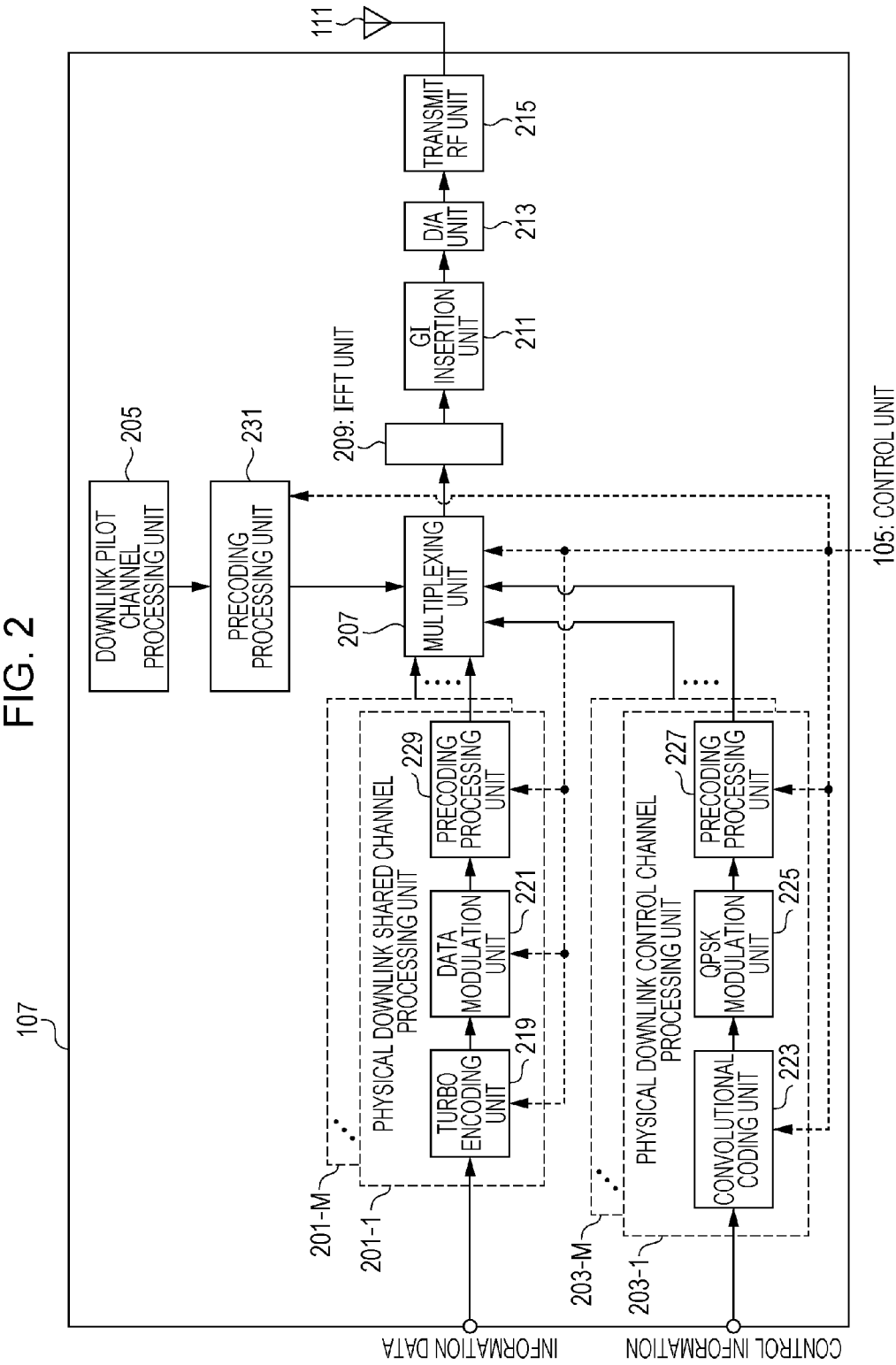
FIG. 2 is a schematic block diagram illustrating a configuration of a transmission processing unit 107 of the base station device 3 according to the embodiment of the present invention.
Figure 3:
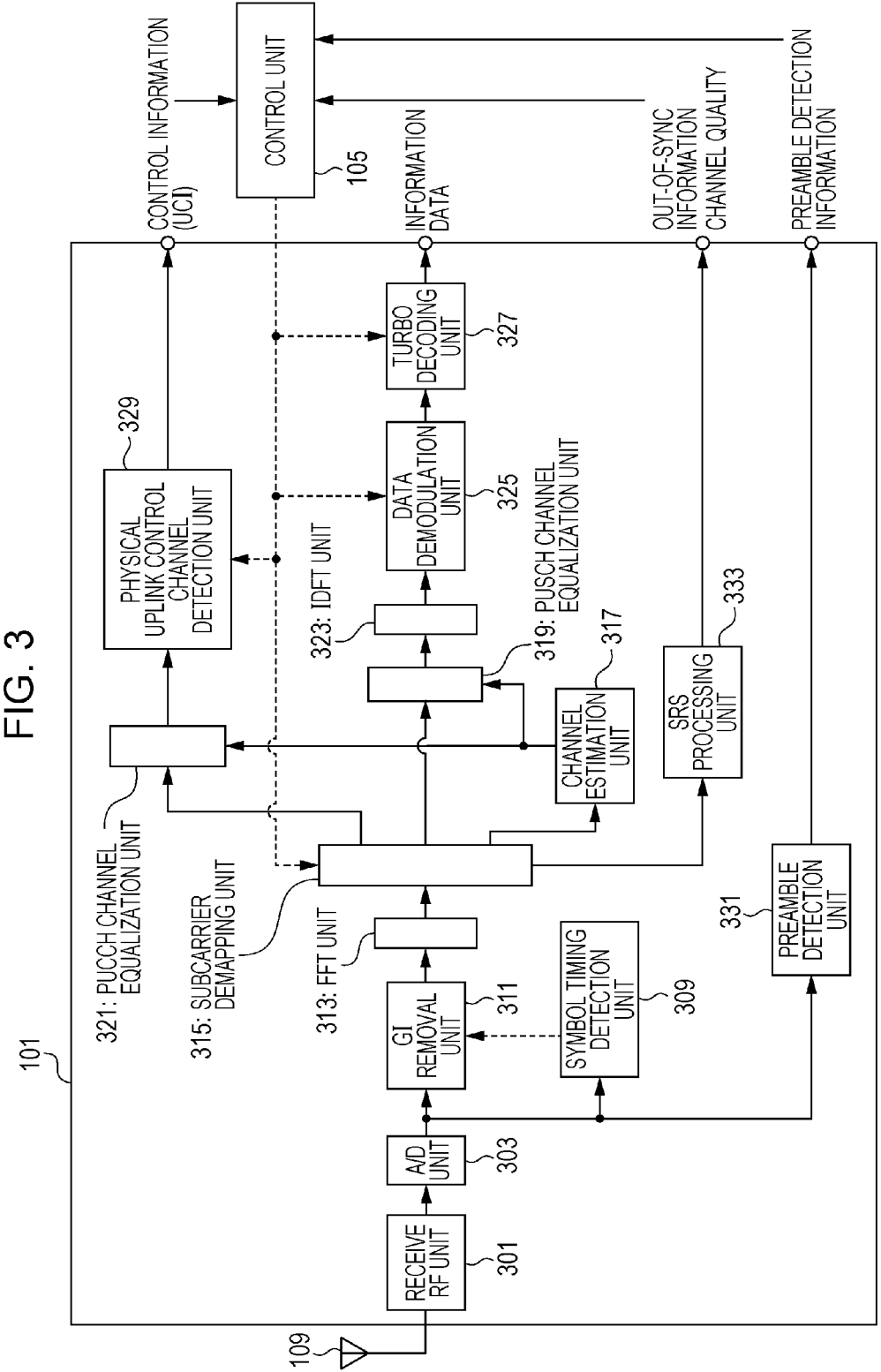
FIG. 3 is a schematic block diagram illustrating a configuration of a reception processing unit 101 of the base station device 3 according to the embodiment of the present invention.

As illustrated in FIG. 2, each of the physical downlink shared channel processing units 201 includes a turbo encoding unit 219, a data modulation unit 221, and a precoding processing unit 229. As illustrated in FIG. 2, each of the physical downlink control channel processing units 203 includes a convolutional coding unit 223, a QPSK modulation unit 225, and a precoding processing unit 227. The physical downlink shared channel processing unit 201 performs baseband signal processing to transmit the information data to the mobile station device 5 using the OFDM scheme. The turbo encoding unit 219 performs turbo encoding on the input information data at the coding rate input from the control unit 105 to increase the error tolerance of the data, and outputs the encoded data to the data modulation unit 221. The data modulation unit 221 modulates the data encoded by the turbo encoding unit 219, using the modulation scheme input from the control unit 105, such as a modulation scheme, for example, QPSK (Quadrature Phase Shift Keying), 16QAM (16 Quadrature Amplitude Modulation), or 64QAM (64 Quadrature Amplitude Modulation), and generates a signal sequence of modulation symbols. The data modulation unit 221 outputs the generated signal sequence to the precoding processing unit 229. The precoding processing unit 229 performs precoding processing (beamforming process) on the signal input from the data modulation unit 221, and outputs the resulting signal to the multiplexing unit 207. The precoding processing preferably includes performing phase rotation and the like on the generated signal so that the mobile station device 5 can efficiently receive the signal (for example, the received power becomes maximum or the interference becomes minimum).

The physical downlink control channel processing unit 203 performs baseband signal processing to transmit the DCI input from the control unit 105 using the OFDM scheme. The convolutional coding unit 223 performs convolutional coding in accordance with the coding rate input from the control unit 105 to increase the error tolerance of the DCI. The DCI is controlled in bits. The convolutional coding unit 223 also performs rate matching to adjust the number of output bits with respect to the bits on which the convolutional coding process has been performed, in accordance with the coding rate input from the control unit 105. The convolutional coding unit 223 outputs the encoded DCI to the QPSK modulation unit 225. The QPSK modulation unit 225 modulates the DCI encoded by the convolutional coding unit 223 using a QPSK modulation scheme, and outputs the modulated signal sequence of modulation symbols to the precoding processing unit 227. The precoding processing unit 227 performs precoding processing on the signal input from the QPSK modulation unit 225, and outputs the resulting signal to the multiplexing unit 207. The precoding processing unit 227 may output the signal input from the QPSK modulation unit 225 to the multiplexing unit 207 without performing precoding processing on the input signal.

The downlink pilot channel processing unit 205 generates downlink reference signals (CRS, UE specific RS, and CSI-RS) that are known signals in the mobile station device 5, and outputs the generated reference signals to the precoding processing unit 231. The precoding processing unit 231 outputs the CRS and CSI-RS input from the downlink pilot channel processing unit 205 to the multiplexing unit 207 without performing precoding processing. The precoding processing unit 231 performs precoding processing on the UE specific RS input from the downlink pilot channel processing unit 205, and outputs the UE specific RS to the multiplexing unit 207. The precoding processing unit 231 performs a process, which is similar to the process performed on the PDSCH by the precoding processing unit 229 and/or the process performed on the PDCCH by the precoding processing unit 227, on the UE specific RS. Accordingly, when the mobile station device 5 demodulates the PDSCH and PDCCH signals to which the precoding processing has been applied, an equalized channel in which channel (transmission path) variations in the downlink and phase rotation by the precoding processing unit 229 and the precoding processing unit 227 are combined can be estimated for the UE specific RS. That is, the mobile station device 5 can demodulate the signals subjected to precoding processing (the signals transmitted via coordinated communication) without the need for the base station device 3 to notify the mobile station device 5 of information (the amount of phase rotation) on the precoding processing performed by the precoding processing unit 229 and the precoding processing unit 227. For example, if precoding processing is not used for a PDSCH on which a demodulation process such as channel compensation is performed using the UE specific RS, the precoding processing unit 231 outputs the UE specific RS to the multiplexing unit 207 without performing precoding processing.

The multiplexing unit 207 multiplexes the signal input from the downlink pilot channel processing unit 205, the signals input from the physical downlink shared channel processing units 201, and the signals input from the physical downlink control channel processing units 203 with the downlink subframe in accordance with an instruction from the control unit 105. The control signals set by the radio resource control unit 103, concerning the allocation of DL PRBs for PDSCH and the allocation of resources for PDCCH, are input to the control unit 105. The control unit 105 controls the processing of the multiplexing unit 207 in accordance with the control signals.

The multiplexing unit 207 multiplexes the PDSCH and the PDCCH basically using time multiplexing, as illustrated in FIG. 9. The multiplexing unit 207 further multiplexes the downlink pilot channels and the other channels using time-frequency multiplexing. In some cases, the multiplexing unit 207 may multiplex the PDSCH addressed to each mobile station device 5 in units of DL PRB pairs, and may multiplex the PDSCH using a plurality of DL PRBs pairs per mobile station device 5. The multiplexing unit 207 outputs the multiplexed signal to the IFFT unit 209.

The IFFT unit 209 performs an inverse fast Fourier transform on the signal multiplexed by the multiplexing unit 207, modulates the resulting signal using the OFDM scheme, and outputs the modulated signal to the GI insertion unit 211. The GI insertion unit 211 adds a guard interval to the signal modulated using the OFDM scheme by the IFFT unit 209 to generate a baseband digital signal including OFDM symbols. As known in the art, a guard interval is generated by a copy of part of the first or last OFDM symbol to be transmitted. The GI insertion unit 211 outputs the generated baseband digital signal to the D/A unit 213. The D/A unit 213 converts the baseband digital signal input from the GI insertion unit 211 into an analog signal, and outputs the analog signal to the transmit RF unit 215. The transmit RF unit 215 generates an intermediate-frequency in-phase component and quadrature component from the analog signal input from the D/A unit 213, and removes the extra frequency component for the intermediate frequency band. Then, the transmit RF unit 215 converts (upconverts) the intermediate-frequency signal into a high-frequency signal, removes the extra frequency component, provides power amplification to the resulting signal, and transmits the power-amplified signal to the mobile station device 5 through the transmit antenna 111.

<Configuration of Reception Processing Unit 101 of Base Station Device 3>

The details of the reception processing unit 101 of the base station device 3 will be described hereinafter. FIG. 3 is a schematic block diagram illustrating a configuration of the reception processing unit 101 of the base station device 3 according to an embodiment of the present invention. As illustrated in FIG. 3, the reception processing unit 101 includes a receive RF unit 301, an A/D (Analog/Digital converter) unit 303, a symbol timing detection unit 309, a GI removal unit 311, an FFT unit 313, a subcarrier demapping unit 315, a channel estimation unit 317, a PUSCH channel equalization unit 319, a PUCCH channel equalization unit 321, an IDFT unit 323, a data demodulation unit 325, a turbo decoding unit 327, a physical uplink control channel detection unit 329, a preamble detection unit 331, and an SRS processing unit 333.

The receive RF unit 301 appropriately amplifies the signal received by the receive antenna 109, converts (down-converts) the amplified signal into an intermediate-frequency signal, removes the unnecessary frequency component, controls the amplification level so that the signal level can be appropriately maintained, and orthogonally demodulates the received signal in accordance with the in-phase component and quadrature component of the received signal. The receive RF unit 301 outputs the orthogonally demodulated analog signal to the A/D unit 303. The A/D unit 303 converts the analog signal orthogonally demodulated by the receive RF unit 301 into a digital signal, and outputs the obtained digital signal to the symbol timing detection unit 309, the GI removal unit 311, and the preamble detection unit 331.

The symbol timing detection unit 309 detects the timing of symbols in accordance with the signal input from the A/D unit 303, and outputs a control signal indicating the detected timing of symbol boundaries to the GI removal unit 311. The GI removal unit 311 removes the portion corresponding to the guard interval from the signal input from the A/D unit 303 in accordance with the control signal from the symbol timing detection unit 309, and outputs the signal of the remaining portion to the FFT unit 313. The FFT unit 313 performs a fast Fourier transform on the signal input from the GI removal unit 311, demodulates the resulting signal using the DFT-Spread-OFDM scheme, and outputs the obtained signal to the subcarrier demapping unit 315. The number of points used in the FFT unit 313 is equal to the number of points used in an IFFT unit of the mobile station device 5 described below.

The subcarrier demapping unit 315 separates the signal demodulated by the FFT unit 313 into the DM RS, the SRS, the PUSCH signal, and the PUCCH signal in accordance with the control signal input from the control unit 105. The subcarrier demapping unit 315 outputs the separated DMRS to the channel estimation unit 317, outputs the separated SRS to the SRS processing unit 333, outputs the separated PUSCH signal to the PUSCH channel equalization unit 319, and outputs the separated PUCCH signal to the PUCCH channel equalization unit 321.

The channel estimation unit 317 estimates channel variations using the DM RS separated by the subcarrier demapping unit 315 and using a known signal. The channel estimation unit 317 outputs an estimated channel estimation value to the PUSCH channel equalization unit 319 and the PUCCH channel equalization unit 321. The PUSCH channel equalization unit 319 equalizes the amplitude and phase of the PUSCH signal separated by the subcarrier demapping unit 315 in accordance with the channel estimation value input from the channel estimation unit 317. The term "equalization", as used herein, refers to a process for compensating the channel variations that a signal suffers during radio communication. The PUSCH channel equalization unit 319 outputs the adjusted signal to the IDFT unit 323.

The IDFT unit 323 performs an inverse discrete Fourier transform on the signal input from the PUSCH channel equalization unit 319, and outputs the resulting signal to the data demodulation unit 325. The data demodulation unit 325 demodulates the PUSCH signal converted by the IDFT unit 323, and outputs the demodulated PUSCH signal to the turbo decoding unit 327. This demodulation operation is a demodulation operation compatible with the modulation scheme used by a data modulation unit of the mobile station device 5, and the modulation scheme is input from the control unit 105. The turbo decoding unit 327 decodes the demodulated PUSCH signal input from the data demodulation unit 325 to obtain information data. A coding rate is input from the control unit 105.

The PUCCH channel equalization unit 321 equalizes the amplitude and phase of the PUCCH signal separated by the subcarrier demapping unit 315 in accordance with the channel estimation value input from the channel estimation unit 317. The PUCCH channel equalization unit 321 outputs the equalized signal to the physical uplink control channel detection unit 329.

The physical uplink control channel detection unit 329 demodulates and decodes the signal input from the PUCCH channel equalization unit 321 to detect UCI. The physical uplink control channel detection unit 329 performs a process for demultiplexing the signal multiplexed in the frequency domain and/or the frequency domain. The physical uplink control channel detection unit 329 performs a process for detecting ACK/NACK, SR, and CQI from the PUCCH signal code-multiplexed in the frequency domain and/or the time domain, using the code sequence used on the transmitter side. Specifically, the physical uplink control channel detection unit 329 performs a detection process using a frequency domain code sequence, that is, a process for demultiplexing the signal code-multiplexed in the frequency domain, by multiplying each subcarrier signal for PUCCH by one code in the code sequence and then combining the signals multiplied by the respective codes. Specifically, the physical uplink control channel detection unit 329 performs a detection process using a time domain code sequence, that is, a process for demultiplexing the signal code-multiplexed in the time domain, by multiplying a signal of each SC-FDMA symbol for PUCCH by one code in the code sequence and then combining the signals multiplied by the respective codes. The physical uplink control channel detection unit 329 sets a detection process for the PUCCH signal in accordance with the control signal from the control unit 105.

The SRS processing unit 333 measures the channel quality using the SRS input from the subcarrier demapping unit 315, and outputs the measured channel quality on the UL PRBs to the control unit 105. The SRS processing unit 333 is instructed by the control unit 105 about which uplink subframe and which UL PRB signal to measure the channel quality for the mobile station device 5. Further, the SRS processing unit 333 detects an uplink out-of-sync condition using the SRS input from the subcarrier demapping unit 315, and outputs information (out-of-sync information) indicating the uplink out-of-sync condition to the control unit 105. The SRS processing unit 333 may perform a process for detecting an uplink out-of-sync condition from the received signal in the time domain. A specific process equivalent to a process performed by the preamble detection unit 331, described below, may be performed.

The preamble detection unit 331 performs a process for detecting (receiving) preambles transmitted in response to the received signal corresponding to the PRACH, in accordance with the signal input from the A/D unit 303. Specifically, the preamble detection unit 331 performs a correlation process with a replica signal generated using each preamble sequence, which can possibly be transmitted, on the received signals at various timings within the guard time. For example, if the correlation value is higher than a preset threshold value, the preamble detection unit 331 determines that the same signal as the preamble sequence which has been used for the generation of the replica signal used in the correlation process was transmitted from the mobile station device 5. The preamble detection unit 331 further determines that the timing with the highest correlation value is the arrival timing of the preamble sequence. Then, the preamble detection unit 331 generates preamble detection information at least including information indicating the detected preamble sequence and information indicating the arrival timing, and outputs the generated preamble detection information to the control unit 105.

The control unit 105 controls the subcarrier demapping unit 315, the data demodulation unit 325, the turbo decoding unit 327, the channel estimation unit 317, and the physical uplink control channel detection unit 329 in accordance with the control information (DCI) transmitted from the base station device 3 to the mobile station device 5 using the PDCCH and the control information transmitted from the base station device 3 to the mobile station device 5 using the PDSCH. Further, the control unit 105 identifies which resource (uplink subframe, UL PRB, frequency domain code sequence, time domain code sequence, or preamble sequence) each of the PRACH, the PUSCH, the PUCCH, and the SRS, each of which has been transmitted (could have possibly been transmitted) from the mobile station device 5, is composed of, in accordance with the control information transmitted from the base station device 3 to the mobile station device 5.

<Overall Configuration of Mobile Station Device 5>

Figure 4:
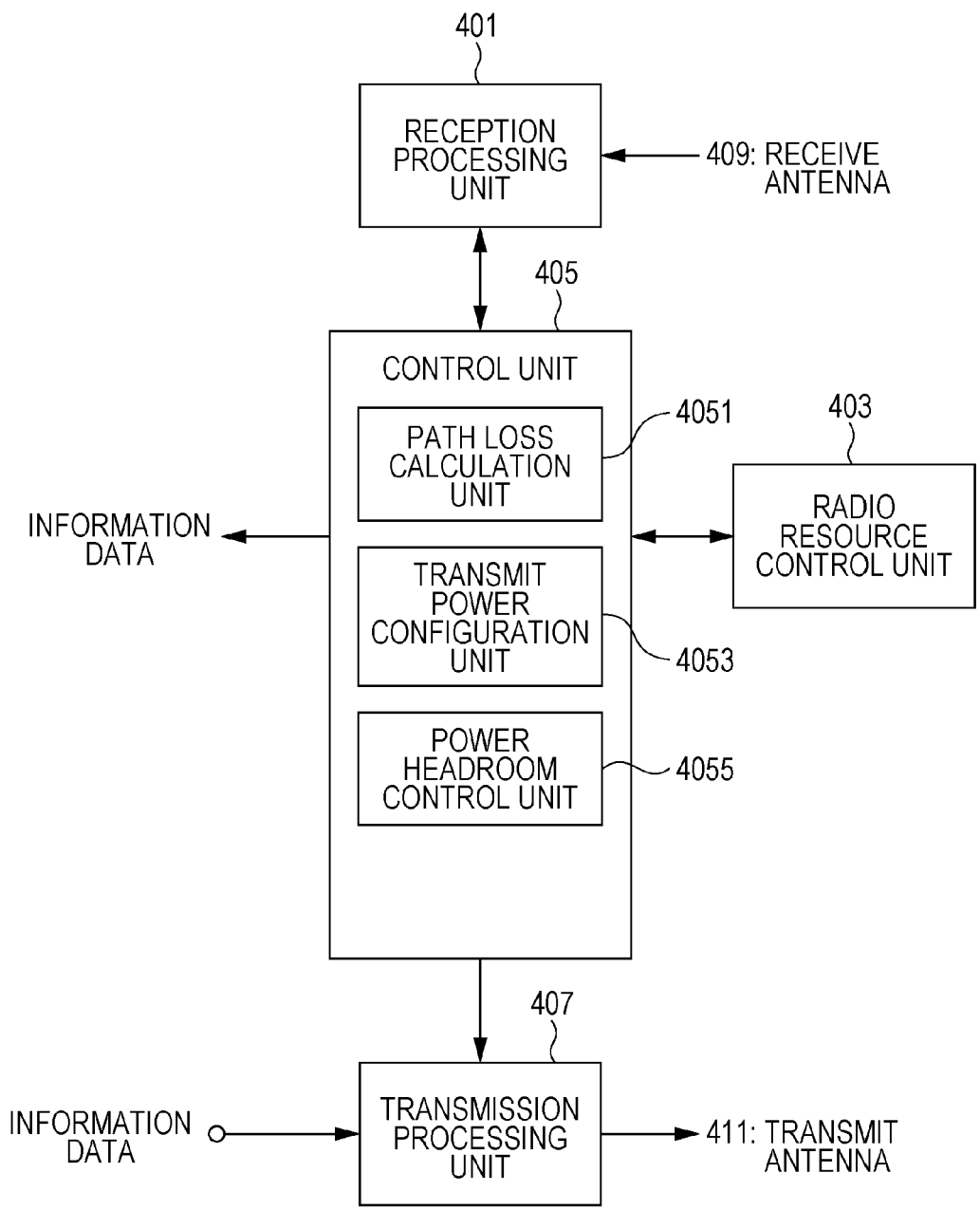
FIG. 4 is a schematic block diagram illustrating a configuration of a mobile station device 5 according to the embodiment of the present invention.
Figure 5:
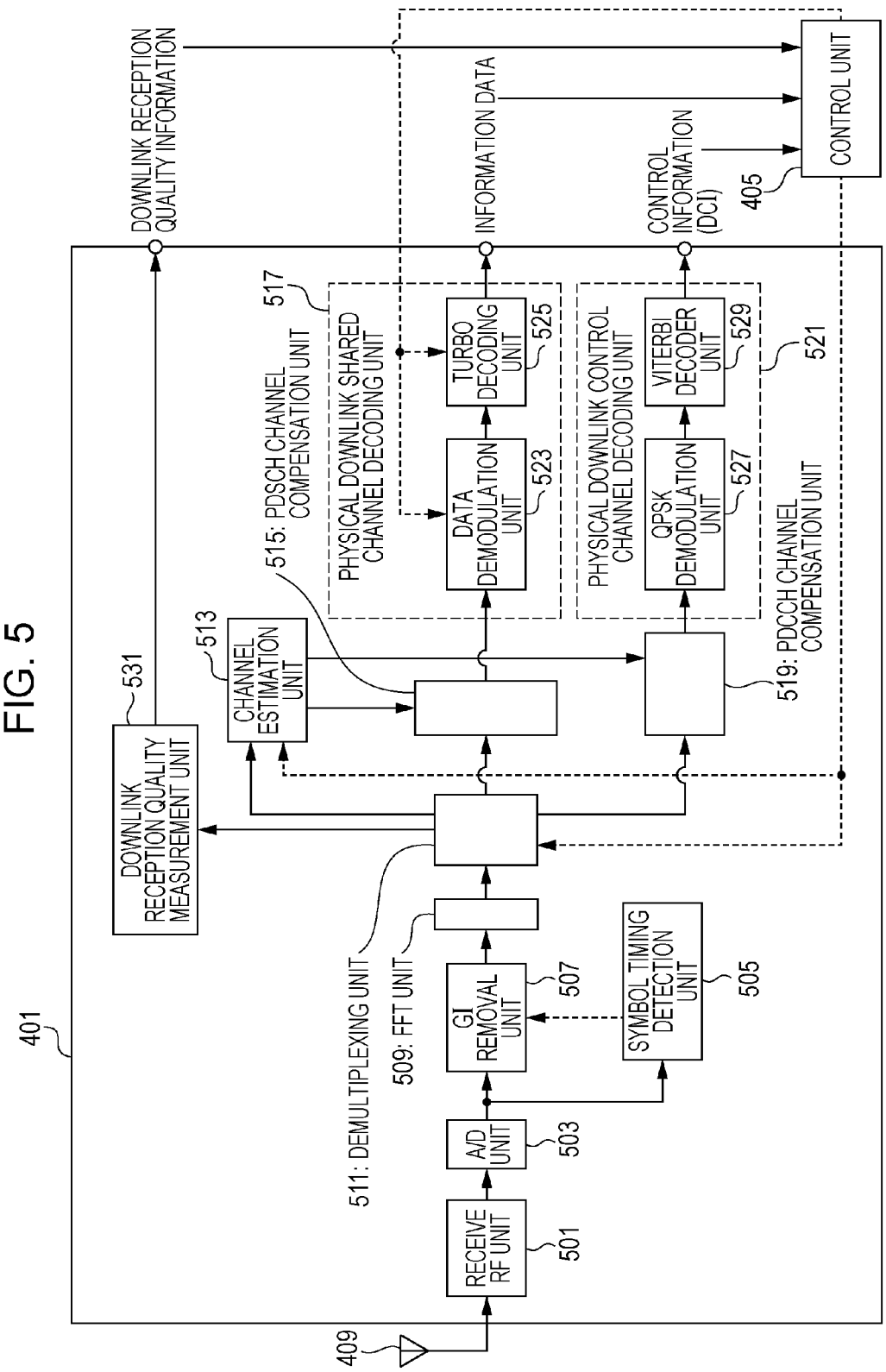
FIG. 5 is a schematic block diagram illustrating a configuration of a reception processing unit 401 of the mobile station device 5 according to the embodiment of the present invention.

A configuration of the mobile station device 5 according to this embodiment will be described hereinafter with reference to FIG. 4, FIG. 5, and FIG. 6. FIG. 4 is a schematic block diagram illustrating a configuration of the mobile station device 5 according to an embodiment of the present invention. As illustrated in FIG. 4, the mobile station device 5 includes a reception processing unit (first reception processing unit) 401, a radio resource control unit (first radio resource control unit) 403, a control unit (first control unit) 405, and a transmission processing unit (first transmission processing unit) 407. The control unit 405 further includes a path loss calculation unit 4051, a transmit power setting unit 4053, and a power headroom control unit 4055.

The reception processing unit 401 receives a signal from the base station device 3, and demodulates and decodes the received signal in accordance with an instruction from the control unit 405. Upon detection of a PDCCH signal addressed to the mobile station device 5, the reception processing unit 401 decodes the PDCCH signal to obtain a DCI and outputs the DCI to the control unit 405. For example, the reception processing unit 401 outputs control information concerning PUCCH resources included in the PDCCH to the control unit 405. Furthermore, in accordance with an instruction of the control unit 405 after the DCI included in the PDCCH has been output to the control unit 405, the reception processing unit 401 decodes a PDSCH addressed to the mobile station device 5 to obtain information data, and outputs the information data to higher layers through the control unit 405. In the DCI in the PDCCH, a downlink assignment includes information indicating allocation of PDSCH resources. Furthermore, the reception processing unit 401 decodes the PDSCH to obtain control information, which is generated by the radio resource control unit 103 of the base station device 3, and outputs the control information to the control unit 405 and also to the radio resource control unit 403 in the mobile station device 5 through the control unit 405. For example, the control information generated by the radio resource control unit 103 of the base station device 3 includes the information concerning the CSI-RS configuration, the information indicating the downlink reference signals used for path loss measurement, the information indicating the values of the parameters related to power headroom reporting, the information indicating the values of some of the parameters related to the transmit power for PUSCH, the information indicating the values of some of the parameters related to the transmit power for PUCCH.

Further, the reception processing unit 401 outputs a cyclic redundancy check (CRC) code included in the PDSCH to the control unit 405. Although not illustrated in the description of the base station device 3, the transmission processing unit 107 of the base station device 3 generates a CRC code from the information data, and transmits the information data and the CRC code on the PDSCH. The CRC code is used to determine whether the data included in the PDSCH is erroneous or not. For example, if information generated by the mobile station device 5 from data using a predetermined generator polynomial is the same as the CRC code generated by the base station device 3 and transmitted on the PDSCH, it is determined that the data is not erroneous. If information generated by the mobile station device 5 from data using a predetermined generator polynomial is different from the CRC code generated by the base station device 3 and transmitted on the PDSCH, it is determined that the data is erroneous.

Furthermore, the reception processing unit 401 measures the reception quality (RSRP: Reference Signal Received Power) in the downlink, and outputs the measurement result to the control unit 405. The reception processing unit 401 measures (calculates) the RSRP from the CRS or CSI-RS in accordance with an instruction from the control unit 405. The details of the reception processing unit 401 will be described below.

The control unit 405 includes the path loss calculation unit 4051, the transmit power setting unit 4053, and the power headroom control unit 4055. The control unit 405 checks the data transmitted from the base station device 3 using the PDSCH and input from the reception processing unit 401, outputs information data in the data to higher layers, and controls the reception processing unit 401 and the transmission processing unit 407 in accordance with control information in the data, which is generated by the radio resource control unit 103 of the base station device 3. The control unit 405 further controls the reception processing unit 401 and the transmission processing unit 407 in accordance with instruction from the radio resource control unit 403. For example, the control unit 405 configures a downlink reference signal for measuring the RSRP in the reception processing unit 401, in accordance with the information indicating the downlink reference signals used for path loss measurement. For example, the control unit 405 controls the transmission processing unit 407 to transmit a signal including power headroom information using the PUSCH specified by the radio resource control unit 403.

The control unit 405 further controls the reception processing unit 401 and the transmission processing unit 407 in accordance with the DCI transmitted from the base station device 3 using the PDCCH and input from the reception processing unit 401. Specifically, the control unit 405 controls the reception processing unit 401 in accordance with a detected downlink assignment, and controls the transmission processing unit 407 in accordance with a detected uplink grant. Further, the control unit 405 compares the data input from the reception processing unit 401 using the predetermined generator polynomial with the CRC code input from the reception processing unit 401, determines whether or not the data is erroneous, and generates ACK/NACK. The control unit 405 further generates SR and CQI in accordance with an instruction from the radio resource control unit 403. In addition, the control unit 405 controls the signal transmission timing of the transmission processing unit 407 in accordance with the adjustment values for the uplink transmission timing or the like notified by the base station device 3.

The path loss calculation unit 4051 calculates the path loss using the RSRP input from the reception processing unit 401. For example, the path loss is calculated by subtracting the averaged RSRP value from the value of the transmit power of the downlink reference signal. For example, the averaging operation is performed by adding together a value obtained by multiplying a value subjected to averaging processing using a certain filter coefficient (filterCoefficient) by (1-filterCoefficient) and a value obtained by multiplying a newly measured value by filterCoefficent. The value of the filter coefficient (filterCoeffcent) used in the mobile station device 5 is configured by the base station device 3 or the RRH 4. The path loss calculation unit 4051 outputs information on the calculated path loss to the transmit power setting unit 4053 and the power headroom control unit 4055.

The transmit power setting unit 4053 sets the uplink transmit power. The transmit power setting unit 4053 sets the desired transmit power for PUSCH in accordance with the path loss input from the path loss calculation unit 4051, the coefficient to be multiplied by the path loss, the parameter based on the number of UL PRBs assigned to the PUSCH, the cell-specific and UE-specific parameters notified by the base station device 3 or the RRH 4 in advance, the parameter based on the transmit power control command notified by the base station device 3 or the RRH 4, and so on. The transmit power setting unit 4053 sets the desired transmit power for PUCCH in accordance with the path loss input from the path loss calculation unit 4051, the parameter based on the signal configuration for PUCCH, the parameter based on the amount of information transmitted on the PUCCH, the cell-specific and UE-specific parameters notified by the base station device 3 or the RRH 4 in advance, the parameter based on the transmit power control command notified by the base station device 3 or the RRH 4, and so on. The transmit power setting unit 4053 sets the desired transmit power for SRS in accordance with the path loss input from the path loss calculation unit 4051, the coefficient to be multiplied by the path loss, the parameter based on the number of UL PRBs assigned to the SRS, the cell-specific and UE-specific parameters notified by the base station device 3 or the RRH 4 in advance, the offset notified by the base station device 3 or the RRH 4 in advance, the parameter based on the transmit power control command notified by the base station device 3 or the RRH 4, and so on. For the DM RS, the transmit power setting unit 4053 sets a transmit power similar to that for the physical channel to which the DMRS is mapped. The various parameters described above may be configured using signaling from the base station device 3 or the RRH 4, or each value may be uniquely set by specification or set in accordance with any other factor. The transmit power setting unit 4053 controls the transmission processing unit 407 to use the set desired transmit power value or the transmit power value set in the mobile station device 5 in advance. The transmit power setting unit 4053 compares the transmit power value set in the mobile station device 5 in advance with the desired transmit power value, selects the smaller value, and controls the transmission processing unit 407 to use the selected transmit power value. Further, the transmit power setting unit 4053 outputs the value of the configured desired transmit power to the power headroom control unit 4055.

The transmit power setting unit 4053 has two modes for the setting of a parameter based on transmit power control commands. The first mode (Accumulation mode) is a mode in which the values of notified transmit power control commands are accumulated. The second mode (Absolute mode) is a mode in which only the value of the latest transmit power control command among a plurality of notified transmit power control commands is used without the accumulation of the notified transmit power control commands. For example, for the PUSCH, either the Accumulation mode or the Absolute mode is configured in the mobile station device 5 using RRC signaling. For the PUCCH, the Accumulation mode is configured in the mobile station device 5.

The power headroom control unit 4055 controls power headroom reporting. The power headroom is information concerning transmit power to spare. The power headroom control unit 4055 controls power headroom transmissions using the parameters related to power headroom reporting (periodicPHR-Timer, prohibitPHR-Timer, and dl-Pathloss-Change) and the path loss input from the path loss calculation unit 4051. Furthermore, the power headroom control unit 4055 determines that the power headroom will be transmitted, in accordance with the information notified by the base station device 3 or the RRH 4, in response to a trigger indicating that a type of downlink reference signal (CRS or CSI-RS) used for calculation in the path loss calculation unit 4051 was additionally configured. The power headroom control unit 4055 calculates the value of the power headroom using the desired transmit power input from the transmit power setting unit 4053 and the nominal UE maximum transmit power. For example, the power headroom control unit 4055 calculates the value of the power headroom by subtracting the value of the transmit power input from the transmit power setting unit 4053 from the value of the nominal UE maximum transmit power. If the power headroom control unit 4055 determines that the power headroom will be transmitted, the power headroom control unit 4055 controls the transmission processing unit 407 to transmit power headroom information using the PUSCH.

The mobile station device 5 is notified of, as parameters related to transmit power, the cell-specific and UE-specific parameters, the coefficient to be multiplied by the path loss, and the offset to be used for the SRS by the base station device 3 using the PDSCH, and the transmit power control commands by the base station device 3 using the PDCCH. Other parameters are calculated from the received signal or are calculated and set in accordance with other information. The transmit power control command for PUSCH is included in the uplink grant, and the transmit power control command for PUCCH is included in the downlink assignment. The control unit 405 controls the signal configuration for PUCCH in accordance with the type of UCI to be transmitted, and controls the signal configuration for PUCCH used in the transmit power setting unit 4053. The various parameters related to transmit power, which have been notified by the base station device 3, are stored as appropriate in the radio resource control unit 403, and the stored values are input to the transmit power setting unit 4053.

The radio resource control unit 403 stores and holds the control information generated by the radio resource control unit 103 of the base station device 3 and notified by the base station device 3, and controls the reception processing unit 401 and the transmission processing unit 407 through the control unit 405. That is, the radio resource control unit 403 has a function of a memory for holding various parameters and so on. For example, the radio resource control unit 403 holds parameters related to the transmit power for PUSCH, PUCCH, and SRS, and outputs a control signal to the control unit 405 so that the transmit power setting unit 4053 uses the parameters notified by the base station device 3. For example, the radio resource control unit 403 holds information concerning the types of the downlink reference signals used for path loss measurement, and outputs a control signal to the control unit 405 so that the reception quality (RSRP) to be used for path loss calculation is measured using the downlink reference signals of the types notified by the base station device 3 or the RRH 4.

In accordance with an instruction of the control unit 405, the transmission processing unit 407 transmits a signal obtained by encoding and modulating information data and UCI to the base station device 3 through a transmit antenna 411 together with the DM RS using the PUSCH and PUCCH resources. The transmission processing unit 407 further transmits the SRS in accordance with an instruction of the control unit 405. The transmission processing unit 407 further transmits preambles to the base station device 3 or the RRH 4 using the PRACH resources in accordance with an instruction of the control unit 405. Furthermore, the transmission processing unit 407 sets the transmit power for PUSCH, PUCCH, PRACH (a description of which is omitted), DM RS, and SRS in accordance with an instruction of the control unit 405. The details of the transmission processing unit 407 will be described below.

<Reception Processing Unit 401 of Mobile Station Device 5>

A description will now be given of the details of the reception processing unit 401 of the mobile station device 5. FIG. 5 is a schematic block diagram illustrating a configuration of the reception processing unit 401 of the mobile station device 5 according to an embodiment of the present invention. As illustrated in FIG. 5, the reception processing unit 401 includes a receive RF unit 501, an A/D unit 503, a symbol timing detection unit 505, a GI removal unit 507, an FFT unit 509, a demultiplexing unit 511, a channel estimation unit 513, a PDSCH channel compensation unit 515, a physical downlink shared channel decoding unit 517, a PDCCH channel compensation unit 519, a physical downlink control channel decoding unit 521, and a downlink reception quality measurement unit 531. As illustrated in FIG. 5, the physical downlink shared channel decoding unit 517 includes a data demodulation unit 523 and a turbo decoding unit 525. As illustrated in FIG. 5, the physical downlink control channel decoding unit 521 includes a QPSK demodulation unit 527 and a Viterbi decoder unit 529.

The receive RF unit 501 appropriately amplifies a signal received by a receive antenna 409, converts (down-converts) the amplified signal into an intermediate-frequency signal, removes the unnecessary frequency component, controls the amplification level so that the signal level can be appropriately maintained, and orthogonally demodulates the received signal in accordance with the in-phase component and quadrature component of the received signal. The receive RF unit 501 outputs the orthogonally demodulated analog signal to the A/D unit 503.

The A/D unit 503 converts the analog signal orthogonally demodulated by the receive RF unit 501 into a digital signal, and outputs the obtained digital signal to the symbol timing detection unit 505 and the GI removal unit 507. The symbol timing detection unit 505 detects the timing of symbols in accordance with the digital signal obtained by the A/D unit 503, and outputs a control signal indicating the detected timing of symbol boundaries to the GI removal unit 507. The GI removal unit 507 removes the portion corresponding to the guard interval from the digital signal output from the A/D unit 503 in accordance with the control signal from the symbol timing detection unit 505, and outputs the signal of the remaining portion to the FFT unit 509. The FFT unit 509 performs a fast Fourier transform on the signal input from the GI removal unit 507, demodulates the obtained signal using the OFDM scheme, and outputs the obtained signal to the demultiplexing unit 511.

The demultiplexing unit 511 demultiplexes the signal demodulated by the FFT unit 509 into the PDCCH signal and the PDSCH signal in accordance with the control signal input from the control unit 405. The demultiplexing unit 511 outputs the obtained PDSCH signal to the PDSCH channel compensation unit 515, and outputs the obtained PDCCH signal to the PDCCH channel compensation unit 519. The demultiplexing unit 511 further demultiplexes downlink resource elements upon which the downlink pilot channels are mapped, and outputs downlink reference signals (CRS and UE specific RS) for the downlink pilot channels to the channel estimation unit 513. The demultiplexing unit 511 further outputs downlink reference signals (CRS and CSI-RS) for the downlink pilot channels to the downlink reception quality measurement unit 531. The demultiplexing unit 511 outputs the PDCCH signal to the PDCCH channel compensation unit 519, and outputs the PDSCH signal to the PDSCH channel compensation unit 515.

The channel estimation unit 513 estimates channel variations using the downlink reference signals (CRS and UE specific RS) for the downlink pilot channels, which are obtained by the demultiplexing unit 511 through demultiplexing, and a known signal. The channel estimation unit 513 outputs channel compensation values for amplitude and phase adjustment to the PDSCH channel compensation unit 515 and the PDCCH channel compensation unit 519 so as to compensate for the channel variations. The channel estimation unit 513 independently estimates channel variations using the CRS and UE specific RS, and outputs channel compensation values. Alternatively, the channel estimation unit 513 estimates channel variations using the CRS or UE specific RS in accordance with an instruction from the base station device 3, and outputs a channel compensation value. In the base station device 3 or the RRH 4, precoding processing that is common to the process used for the UE specific RS is executed on the physical channels (PDSCH and E-PDCCH) on which the mobile station device 5 performs channel compensation using the UE specific RS.

The PDSCH channel compensation unit 515 adjusts the amplitude and phase of the PDSCH signal obtained by the demultiplexing unit 511 through demultiplexing, in accordance with the channel compensation value input from the channel estimation unit 513. For example, the PDSCH channel compensation unit 515 adjusts the PDSCH signal transmitted using coordinated communication in accordance with the channel compensation value generated based on the UE specific RS by the channel estimation unit 513, and adjusts the PDSCH signal transmitted without using coordinated communication in accordance with the channel compensation value generated based on the CRS by the channel estimation unit 513. The PDSCH channel compensation unit 515 outputs the channel-adjusted signal to the data demodulation unit 523 of the physical downlink shared channel decoding unit 517. The PDSCH channel compensation unit 515 may also adjust the PDSCH signal transmitted without using coordinated communication (without application of precoding processing) in accordance with the channel compensation value generated based on the UE specific RS by the channel estimation unit 513.

The physical downlink shared channel decoding unit 517 demodulates and decodes the PDSCH in accordance with an instruction from the control unit 405, and detects information data. The data demodulation unit 523 demodulates the PDSCH signal input from the channel compensation unit 515, and outputs the demodulated PDSCH signal to the turbo decoding unit 525. This demodulation operation is a demodulation operation compatible with the modulation scheme used by the data modulation unit 221 of the base station device 3. The turbo decoding unit 525 decodes the demodulated PDSCH signal input from the data demodulation unit 523 to obtain information data, and outputs the obtained information data to higher layers through the control unit 405. The control information transmitted using the PDSCH, which is generated by the radio resource control unit 103 of the base station device 3, and the like are also output to the control unit 405, and are output also to the radio resource control unit 403 through the control unit 405. The CRC code included in the PDSCH is also output to the control unit 405.

The PDCCH channel compensation unit 519 adjusts the amplitude and phase of the PDCCH signal obtained by the demultiplexing unit 511 through demultiplexing, in accordance with the channel compensation value input from the channel estimation unit 513. For example, the PDCCH channel compensation unit 519 adjusts the PDCCH signal in accordance with the channel compensation value generated based on the CRS by the channel estimation unit 513, and adjusts the PDCCH (E-PDCCH) signal transmitted using coordinated communication in accordance with the channel compensation value generated based on the UE specific RS by the channel estimation unit 513. The PDCCH channel compensation unit 519 outputs the adjusted signal to the QPSK demodulation unit 527 of the physical downlink control channel decoding unit 521. The PDCCH channel compensation unit 519 may also adjust the PDCCH (including E-PDCCH) signal transmitted without using coordinated communication (without application of precoding processing) in accordance with the channel compensation value generated based on the UE specific RS by the channel estimation unit 513.

The physical downlink control channel decoding unit 521 demodulates and decodes the signal input from the PDCCH channel compensation unit 519, and detects control data as follows. The QPSK demodulation unit 527 performs QPSK demodulation on the PDCCH signal, and outputs the demodulated signal to the Viterbi decoder unit 529. The Viterbi decoder unit 529 decodes the signal demodulated by the QPSK demodulation unit 527, and output the decoded DCI to the control unit 405. This signal is expressed in bits. The Viterbi decoder unit 529 also performs rate dematching to adjust the number of bits, on which the Viterbi decoding process is to be performed, with respect to the input bits.

The mobile station device 5 assumes a plurality of coding rates, and performs a process for detecting the DCI addressed thereto for the PDCCH. The mobile station device 5 performs a different decoding process for each of the assumed coding rates on the PDCCH signal, and acquires the DCI included in a PDCCH on which no error has been detected in the CRC code added to the PDCCH together with the DCI. This process is referred to as blind decoding. The mobile station device 5 may perform blind decoding only on signals of some of the resources in the downlink system band, instead of performing blind decoding on signals of all the resources. The area of some resources on which blind decoding is performed is referred to as a search space. The mobile station device 5 may also perform blind decoding on different resources for each coding rate.

The control unit 405 determines whether or not the DCI input from the Viterbi decoder unit 529 contains no error and is the DCI addressed to the mobile station device 5. If it is determined that the DCI input from the Viterbi decoder unit 529 contains no error and is the DCI addressed to the mobile station device 5, the control unit 405 controls the demultiplexing unit 511, the data demodulation unit 523, the turbo decoding unit 525, and the transmission processing unit 407 in accordance with the DCI. For example, if the DCI is a downlink assignment, the control unit 405 controls the reception processing unit 401 to decode the PDSCH signal. Also for the PDCCH, like the PDSCH, a CRC code is included. The control unit 405 determines whether or not the DCI for PDCCH is erroneous, by using the CRC code.

The downlink reception quality measurement unit 531 measures the downlink reception quality (RSRP) of a cell using the downlink reference signals (CRS and CSI-RS) for the downlink pilot channels, and outputs the measured downlink reception quality information to the control unit 405. The downlink reception quality measurement unit 531 also measures the instantaneous channel quality in order to generate the CQI that the mobile station device 5 notifies the base station device 3 or the RRH 4 of. The downlink reception quality measurement unit 531 is controlled by the base station device 3 or the RRH 4 through the control unit 405 about which type of downlink reference signal (CRS, CSI-RS, CRS and CSI-RS, or CSI-RS and CSI-RS) to use to measure the RSRP. This control is controlled using the information indicating the downlink reference signals used for path loss measurement. For example, the downlink reception quality measurement unit 531 measures the RSRP using the CRS. For example, the downlink reception quality measurement unit 531 measures the RSRP using the CSI-RS. For example, the downlink reception quality measurement unit 531 measures the RSRP using the CRS, and further measures the RSRP using the CSI-RS. For example, the downlink reception quality measurement unit 531 measures the RSRP using a CSI-RS with a given CSI-RS configuration, and further measures the RSRP using a CSI-RS with a different CSI-RS configuration. Alternatively, the downlink reception quality measurement unit 531 measures the RSRP using the CRS all the time, and additionally measures the RSRP using the CSI-RS upon an instruction from the base station device 3 or the RRH 4. The downlink reception quality measurement unit 531 outputs information on the measured RSRP and the like to the control unit 405.

<Transmission Processing Unit 407 of Mobile Station Device 5>

Figure 6:
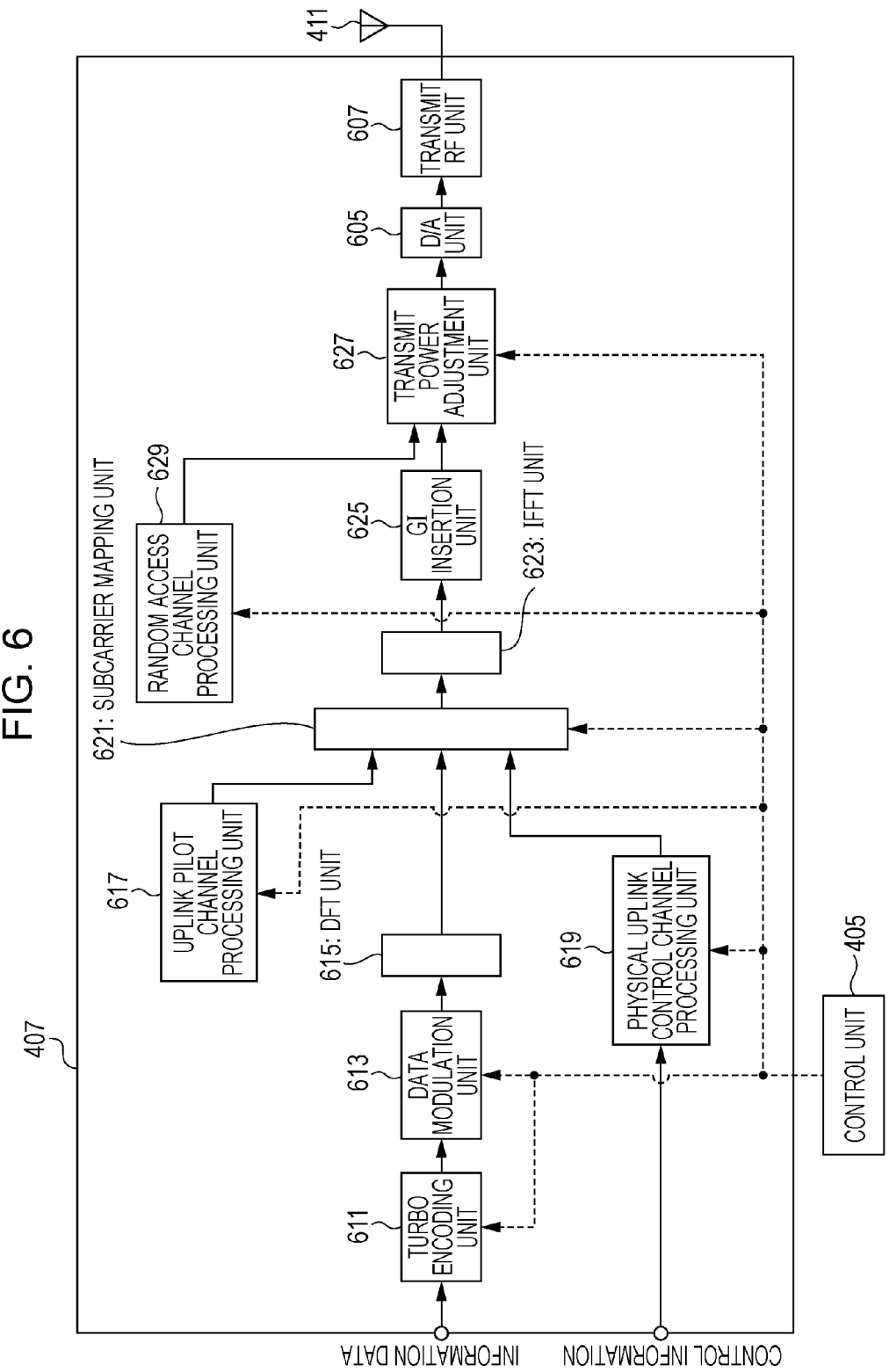
FIG. 6 is a schematic block diagram illustrating a configuration of a transmission processing unit 407 of the mobile station device 5 according to the embodiment of the present invention.

FIG. 6 is a schematic block diagram illustrating a configuration of the transmission processing unit 407 of the mobile station device 5 according to an embodiment of the present invention. As illustrated in FIG. 6, the transmission processing unit 407 includes a turbo encoding unit 611, a data modulation unit 613, a DFT unit 615, an uplink pilot channel processing unit 617, a physical uplink control channel processing unit 619, a subcarrier mapping unit 621, an IFFT unit 623, a GI insertion unit 625, a transmit power adjustment unit 627, a random access channel processing unit 629, a D/A unit 605, a transmit RF unit 607, and the transmit antenna 411. The transmission processing unit 407 encodes and modulates information data and UCI to generate signals to be transmitted using the PUSCH and PUCCH, and adjusts the transmit power for PUSCH and PUCCH. The transmission processing unit 407 generates a signal to be transmitted using the PRACH, and adjusts the transmit power for PRACH. The transmission processing unit 407 generates a DM RS and an SRS, and adjusts the transmit power for the DM RS and SRS.

The turbo encoding unit 611 performs turbo encoding on the input information data at the coding rate specified by the control unit 405 to increase the error tolerance of the data, and outputs the encoded data to the data modulation unit 613. The data modulation unit 613 modulates the encoded data encoded by the turbo encoding unit 611, using the modulation scheme specified by the control unit 405, such as a modulation scheme, for example, QPSK, 16QAM, or 64QAM, and generates a signal sequence of modulation symbols. The data modulation unit 613 outputs the generated signal sequence of modulation symbols to the DFT unit 615. The DFT unit 615 performs a discrete Fourier transform on the signal output from the data modulation unit 613, and outputs the resulting signal to the subcarrier mapping unit 621.

The physical uplink control channel processing unit 619 performs baseband signal processing to transmit the UCI input from the control unit 405. The UCI input to the physical uplink control channel processing unit 619 includes ACK/NACK, SR, and CQI. The physical uplink control channel processing unit 619 performs baseband signal processing to generate a signal, and outputs the generated signal to the subcarrier mapping unit 621. The physical uplink control channel processing unit 619 encodes the information bits of the UCI to generate a signal.

The physical uplink control channel processing unit 619 further performs signal processing related to code multiplexing in the frequency domain and/or code multiplexing in the time domain on the signal generated from the UCI. The physical uplink control channel processing unit 619 multiplies the PUCCH signal generated from the ACK/NACK information bits, the SR information bits, or the CQI information bits by the code sequence specified by the control unit 405 in order to implement code multiplexing in the frequency domain. The physical uplink control channel processing unit 619 multiplies the PUCCH signal generated from the ACK/NACK information bits or the SR information bits by the code sequence specified by the control unit 405 in order to implement code multiplexing in the time domain.

The uplink pilot channel processing unit 617 generates the SRS and the DM RS, which are known signals in the base station device 3, in accordance with an instruction from the control unit 405, and outputs the generated signals to the subcarrier mapping unit 621.

The subcarrier mapping unit 621 maps the signals input from the uplink pilot channel processing unit 617, the signal input from the DFT unit 615, and the signal input from the physical uplink control channel processing unit 619 to subcarriers in accordance with an instruction from the control unit 405, and outputs the resulting signal to the IFFT unit 623.

The IFFT unit 623 performs an inverse fast Fourier transform on the signal output from the subcarrier mapping unit 621, and outputs the obtained signal to the GI insertion unit 625. The number of points used in the IFFT unit 623 is larger than the number of points used in the DFT unit 615. The mobile station device 5 modulates the signals to be transmitted using the PUSCH, in accordance with the DFT-Spread-OFDM scheme by using the DFT unit 615, the subcarrier mapping unit 621, and the IFFT unit 623. The GI insertion unit 625 adds a guard interval to the signal input from the IFFT unit 623, and outputs the resulting signal to the transmit power adjustment unit 627.

The random access channel processing unit 629 generates a signal to be transmitted using the PRACH, using the preamble sequence specified by the control unit 405, and outputs the generated signal to the transmit power adjustment unit 627.

The transmit power adjustment unit 627 adjusts the transmit power for the signal input from the GI insertion unit 625 or the signal input from the random access channel processing unit 629 in accordance with the control signal from the control unit 405 (the transmit power setting unit 4053), and outputs the resulting signal to the D/A unit 605. In the transmit power adjustment unit 627, the average transmit power for PUSCH, PUCCH, DM RS, SRS, and PRACH is controlled for each uplink subframe.

The D/A unit 605 converts the baseband digital signal input from the transmit power adjustment unit 627 into an analog signal, and outputs the analog signal to the transmit RF unit 607. The transmit RF unit 607 generates an intermediate-frequency in-phase component and quadrature component from the analog signal input from the D/A unit 605, and removes the extra frequency component for the intermediate frequency band. Then, the transmit RF unit 607 converts (upconverts) the intermediate-frequency signal into a high-frequency signal, removes the extra frequency component, provides power amplification to the resulting signal, and transmits the power-amplified signal to the base station device 3 through the transmit antenna 411.

Figure 7:
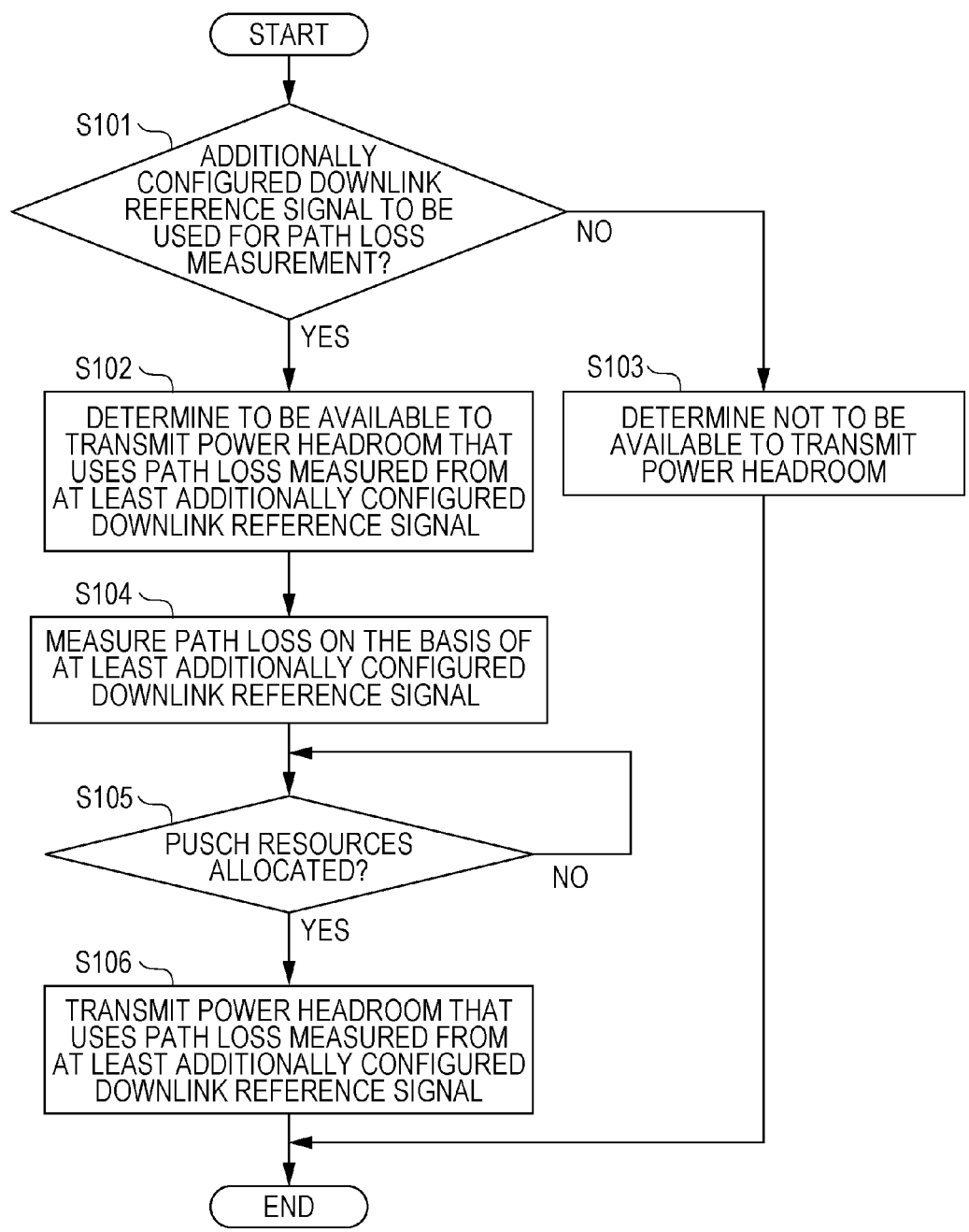
FIG. 7 is a flowchart illustrating an example of a power headroom transmission process of the mobile station device 5 according to the embodiment of the present invention.

FIG. 7 is a flowchart illustrating an example of a power headroom transmission process of the mobile station device 5 according to an embodiment of the present invention. The mobile station device 5 determines whether or not a downlink reference signal used for path loss measurement has been additionally configured, in accordance with the information (RRC signaling) received from the base station device 3 or the RRH 4 (step S101). If it is determined that a downlink reference signal used for path loss measurement has been additionally configured (step S101: YES), the mobile station device 5 determines to be in the state of being available to transmit the power headroom which uses the path loss measured from at least the additionally configured downlink reference signal (step S102). If it is determined that a downlink reference signal used for path loss measurement has not been additionally configured (step S101: NO), the mobile station device 5 determines not to be in the state of being available to transmit the power headroom (step S103). Then, the mobile station device 5 measures a path loss on the basis of at least the additionally configured downlink reference signal (step S104). Then, the mobile station device 5 determines whether or not PUSCH resources for new transmission have been allocated (step S105). In step S105, PUSCH resources for which the path loss measured from at least the additionally configured downlink reference signal is used for the calculation of transmit power are targeted. If it is determined that PUSCH resources for new transmission have been allocated (step S105: YES), the mobile station device 5 transmits the power headroom which uses the path loss measured from at least the additionally configured downlink reference signal is transmitted (step S106). If it is determined that PUSCH resources for new transmission have not been allocated (step S105: NO), the mobile station device 5 does not transmit the power headroom, and waits for PUSCH resources to be allocated. In the description of FIG. 7, for simplicity of description, no description is given of processes concerning periodicPHR-Timer, dl-PathlossChange, and prohibitPHR-Timer. The processes concerning periodicPHR-Timer, dl-PathlossChange, and prohibitPHR-Timer are performed in the way as described above. Step S104 is not meant to provide path loss measurement for the purpose of power headroom reporting only. The processing of step S104 may be performed before step S102 or before step S106.

As described above, in an embodiment of the present invention, in response to a trigger indicating that a downlink reference signal (path loss reference) used for path loss measurement (calculation, estimation) was additionally configured by the base station device 3 or the RRH 4, the mobile station device 5 becomes available to transmit the power headroom that uses the path loss measured from at least the additionally configured downlink reference signal. Accordingly, the base station device 3 or the RRH 4 is notified of information concerning the power headroom immediately upon the additional configuration of the path loss used for the calculation of the uplink transmit power value. This allows the base station device 3 or the RRH 4 to efficiently perform uplink scheduling (the allocation of PUSCH resources, the determination of a modulation scheme) for the mobile station device 5. In other words, in a case where a plurality of possible destinations (the base station devices 3 or the RRHs 4) of uplink signals are added, the base station device 3 or the RRH 4 is immediately notified of information concerning the power headroom, and can thus perform uplink scheduling so as to be suitable for each destination. In response to a trigger indicating that a CSI-RS has been additionally configured as a path loss reference, the mobile station device 5 becomes available to transmit the power headroom that uses the path loss measured from the CSI-RS, and the base station device 3 or the RRH 4 is immediately notified of information concerning the power headroom based on the additionally configured path loss reference. Therefore, the base station device 3 or the RRH 4 may efficiently perform uplink scheduling for the mobile station device 5 in which the path loss based on the CRS is used or perform uplink scheduling for the mobile station device 5 in which the path loss based on the CSI-RS is used.

In the first embodiment of the present invention, as described above, in a case where a plurality of different path loss references (CRS and CSI-RS) or (CSI-RS and CSI-RS) are simultaneously configured in the mobile station device 5, various parameters related to power headroom reporting (periodicPHR-Timer, prohibitPHR-Timer, and dl-PathlossChange) are independently configured for the reporting of the power headrooms based on the respective path loss references, and power headroom reporting corresponding to each path loss reference is independently controlled. This enables appropriate exchange of power headroom information based on each path loss reference between the mobile station device 5 and the base station device 3 or between the mobile station device 5 and the RRH 4. Accordingly, the base station device 3 or the RRH 4 may efficiently perform uplink scheduling (the allocation of PUSCH resources, the determination of a modulation scheme) for the mobile station device 5 capable of transmitting the respective PUSCHs for which the uplink transmit power value is calculated using the path losses based on the respective path loss references while switching the PUSCHs in units of uplink subframes.

In the embodiment of the present invention, a description has been given of the case where the mobile station device 5 becomes (determines to become) available to transmit the power headroom immediately upon the additional configuration of a downlink reference signal used for path loss measurement. In order to increase the accuracy of path loss measurement, may become (may determine to become) available to transmit the power headroom after calculating the path loss by averaging the results of downlink reference signals in a plurality of downlink subframes. Alternatively, while the mobile station device 5 becomes (determines to become) available to transmit the power headroom immediately upon the additional setting of a downlink reference signal used for path loss measurement, the mobile station device 5 may transmit the power headroom after calculating the path loss by averaging the results of downlink reference signals in a plurality of downlink subframes.

The mobile station device 5 is not limited to a movable terminal. The present invention may be practiced by incorporating the functions of the mobile station device 5 into a fixed terminal.

It should be noted that, in the embodiment of the present invention, the term "different types of downlink reference signals" is used to include the meaning of CSI-RSs with different CSI-RS configurations.

The characteristic means of the present invention described above may also be implemented by incorporating functions into an integrated circuit and controlling the functions. That is, an integrated circuit of the present invention is an integrated circuit mounted in the mobile station device 5 that communicates with the base station device 3 or the RRH 4, including a first reception processing unit configured to receive a signal from the base station device 3 or the RRH 4, a path loss calculation unit configured to calculate path losses, each based on one of a plurality of types of reference signals received by the first reception processing unit, a transmit power setting unit configured to configure a desired transmit power for an uplink signal using the path losses calculated by the path loss calculation unit, and a power headroom control unit configured to generate a power headroom using the desired transmit power set by the transmit power setting unit, the power headroom being information concerning transmit power to spare, and configured to control transmission of the power headroom, wherein the power headroom control unit independently controls a power headroom transmission process that uses each of the path losses calculated based on the plurality of types of reference signals, using an independent parameter for each power headroom transmission process.

In this manner, the mobile station device 5 including an integrated circuit of the present invention is configured to, in a case where a plurality of different path loss references (CRS and CSI-RS) or (CSI-RS and CSI-RS) are simultaneously configured, independently configure various parameters related to power headroom reporting (periodicPHR-Timer, prohibitPHR-Timer, and dl-PathlossChange) for the reporting of the power headrooms based on the respective path loss references, and to independently control power headroom reporting corresponding to each path loss reference. This enables appropriately exchange of power headroom information based on each path loss reference between the mobile station device 5 and the base station device 3 or between the mobile station device 5 and the RRH 4. Accordingly, the base station device 3 or the RRH 4 may efficiently perform uplink scheduling (the allocation of PUSCH resources, the determination of a modulation scheme) for the mobile station device 5 capable of transmitting the respective PUSCHs for which the uplink transmit power value is calculated using the path losses based on the respective path loss references while switching the PUSCHs in units of uplink subframes.

Second Embodiment

Unlike the first embodiment, a second embodiment of the present invention uses common dl-PathlossChange for the transmission process for a plurality of power headrooms. The power headroom control unit 4055 uses common dl-PathlossChange for the transmission process for power headrooms that use path losses calculated based on a plurality of types of reference signals (CRS and CSI-RS) or (CSI-RS and CSI-RS). If the amount by which one of the plurality of path losses calculated by the path loss calculation unit 4051 has changed is larger than the value of dl-PathlossChange, the power headroom control unit 4055 performs control to transmit the power headrooms that use the path losses calculated based on the plurality of types of reference signals.

For example, a description will be made of simultaneous configuration of CRS and CSI-RS as path loss references. dl-PathlossChange common to CRS and CSI-RS is represented by dl-PathlossChange 20. dl-PathlossChange 20 is used for both threshold determination with respect to the amount of change of the path loss measured from the CRS and threshold determination with respect to the amount of change of the path loss measured from the CSI-RS. If the amount by which the path loss measured from the CRS has changed is larger than the value of dl-PathlossChange 20, both the power headroom based on the CRS and the power headroom based on the CSI-RS become available for transmission. If the amount by which the path loss measured from the CSI-RS has changed is larger than the value of dl-PathlossChange 20, both the power headroom based on the CRS and the power headroom based on the CSI-RS become available for transmission. Upon transmission of the power headroom based on any reference signal, the amount of change of the path loss is reset.

For example, a description will be made of simultaneous setting of CSI-RSs with different CSI-RS configurations (a first CSI-RS configuration and a second CSI-RS configuration) as path loss references. dl-PathlossChange common to the CSI-RS with the first CSI-RS configuration and the CSI-RS with the second CSI-RS configuration is represented by dl-PathlossChange 20. dl-PathlossChange 20 is used for both threshold determination with respect to the amount of change of the path loss measured from the CSI-RS with the first CSI-RS configuration and threshold determination with respect to the amount of change of the path loss measured from the CSI-RS with the second CSI-RS configuration. If the amount by which the path loss measured from the CSI-RS with the first CSI-RS configuration has changed is larger than the value of dl-PathlossChange 20, both the power headroom based on the CSI-RS with the first CSI-RS configuration and the power headroom based on the CSI-RS with the second CSI-RS configuration become available for transmission. If the amount by which the path loss measured from the CSI-RS with the second CSI-RS configuration has changed is larger than the value of dl-PathlossChange 20, both the power headroom based on the CSI-RS with the first CSI-RS configuration and the power headroom based on the CSI-RS with the second CSI-RS configuration become available for transmission. Upon transmission of the power headroom based on any reference signal, the amount of change of the path loss is reset.

In the second embodiment, compared to the first embodiment, the amount of signaling of dl-PathlossChange exchanged between the base station device 3 and the mobile station device 5 or between the RRH 4 and the mobile station device 5 may be reduced, resulting in an increase in downlink spectral efficiency.

Third Embodiment

Unlike the first embodiment, in a third embodiment of the present invention, dl-PathlossChange is used only for one power headroom transmission process among a plurality of power headroom transmission processes. The power headroom control unit 4055 uses dl-PathlossChange for only a given power headroom transmission process out of power headroom transmission processes that use respective path losses calculated based on a plurality of types of reference signals (CRS and CSI-RS) or (CSI-RS and CSI-RS). If the amount by which the path loss used in the given power headroom transmission process has changed is larger than the value of dl-PathlossChange, the power headroom control unit 4055 performs control to transmit the power headrooms that use the path losses calculated based on the plurality of types of reference signals. For example, a description will be made of simultaneous setting of CRS and CSI-RS as path loss references. For example, dl-PathlossChange is used only for a power headroom transmission process for the power headroom that uses the path loss measured from the CSI-RS. Here, dl-PathlossChange is represented by dl-PathlossChange 200. If the amount by which the path loss measured from the CSI-RS has changed is larger than the value of dl-PathlossChange 200, both the power headroom based on the CRS and the power headroom based on the CSI-RS become available for transmission.

For example, a description will be made of simultaneous setting of CSI-RSs with different CSI-RS configurations (a first CSI-RS configuration and a second CSI-RS configuration) as path loss references. For example, dl-PathlossChange is used only for the transmission process for the power headroom that uses the path loss measured from the CSI-RS with the first CSI-RS configuration. Here, dl-PathlossChange is represented by dl-PathlossChange 200. If the amount by which the path loss measured from the CSI-RS with the first CSI-RS configuration has changed is larger than the value of dl-PathlossChange 200, both the power headroom based on the CSI-RS with the first CSI-RS configuration and the power headroom based on the CSI-RS with the second CSI-RS configuration become available for transmission.

In the third embodiment, compared to the first embodiment, the transmission process for the power headroom that uses dl-PathlossChange may be reduced, and the processing load imposed on the mobile station device 5 may be reduced. In addition, the amount of signaling of dl-PathlossChange exchanged between the base station device 3 and the mobile station device 5 or between the RRH 4 and the mobile station device 5 may be reduced, resulting in an increase in downlink spectral efficiency. For example, the third embodiment may be suitable for the case where in the normal state, the mobile station device 5 uses the path loss based on the CSI-RS for the configuration of the transmit power of the uplink signal, whereas, in an abnormal state, in a state where the destination of an uplink signal is the RRH 4, the mobile station device 5 uses the path loss based on the CRS for the configuration of the transmit power of the uplink signal so that the destination of the uplink signal is set to the base station device 3. In the third embodiment, while sufficient accuracy is maintained for the path loss used for frequently transmitted uplink signals, the processing load and the amount of signaling may be reduced. The term "abnormal state" refers to a condition in which, for example, a radio link quality problem (Radio Link Failure) has occurred.

Fourth Embodiment

Unlike the second embodiment and the third embodiment, a fourth embodiment of the present invention uses common periodicPHR-Timer for a plurality of power headroom transmission processes. The power headroom control unit 4055 uses common periodicPHR-Timer for the transmission process for power headrooms that use path losses calculated based on a plurality of types of reference signals (CRS and CSI-RS) or (CSI-RS and CSI-RS). When periodicPHR-Timer expires, the power headroom control unit 4055 performs control to transmit the power headrooms that use the path losses calculated based on the plurality of types of reference signals.

For example, a description will be made of simultaneous setting of CRS and CSI-RS as path loss references. periodicPHR-Timer common to CRS and CSI-RS is represented by periodicPHR-Timer 20. If periodicPHR-Timer 20 has expired, both the power headroom based on the CRS and the power headroom based on the CSI-RS become available for transmission. At the time when one of the power headrooms available for transmission is actually transmitted first, periodicPHR-Timer 20 is reset (restart) and measurement is restarted.

For example, a description will be made of simultaneous setting of CSI-RSs with different CSI-RS configurations (a first CSI-RS configuration and a second CSI-RS configuration) as path loss references. periodicPHR-Timer common to the CSI-RS with the first CSI-RS configuration and the CSI-RS with the second CSI-RS configuration is represented by periodicPHR-Timer 20. If periodicPHR-Timer 20 has expired, both the power headroom based on the CSI-RS with the first CSI-RS configuration and the power headroom based on the CSI-RS with the second CSI-RS configuration become available for transmission. At the time when one of the power headrooms available for transmission is actually transmitted first, periodicPHR-Timer 20 is reset (restart) and measurement is restarted.

In the fourth embodiment, compared to the second embodiment and the third embodiment, the amount of signaling of periodicPHR-Timer exchanged between the base station device 3 and the mobile station device 5 or between the RRH 4 and the mobile station device 5 may be reduced, resulting in an increase in downlink spectral efficiency. In the fourth embodiment, furthermore, the number of timers (periodicPHR-Timer) managed by the mobile station device 5 may be reduced, resulting in a reduction in the processing load on the mobile station device 5.

The operations described in the embodiments of the present invention may be implemented by a program. A program operating in the mobile station device 5 and the base station device 3 according to the present invention is a program (a program for causing a computer to function) for controlling a CPU and the like to implement the functions in the foregoing embodiments of the present invention. The information handled in these devices is temporarily accumulated in a RAM while processed, and is then stored in various ROMs or HDDs. The stored information is read by the CPU, if necessary, for modification or writing. A recording medium storing the program may be any of semiconductor media (for example, a ROM, a non-volatile memory card, etc.), optical recording media (for example, a DVD, an MO, an MD, a CD, a BD, etc.), magnetic recording media (for example, a magnetic tape, a flexible disk, etc.), and so on. Furthermore, the loaded program is executed to implement the functions in the embodiments described above. In addition, in accordance with the instructions of the program, the functions in the present invention may be implemented by processing the program in cooperation with an operating system, any other application program, or the like.

In a case where the program is distributed to be usable on market, the program may be stored in a transportable recording medium for distribution, or may be transferred to a server computer connected via a network such as the Internet. In this case, a storage device in the server computer also falls within the scope of the present invention. In addition, part or the entirety of the mobile station device 5 and the base station device 3 in the embodiments described above may be implemented as an LSI, which is typically an integrated circuit. The respective functional blocks of the mobile station device 5 and the base station device 3 may be individually built into chips, or some or all of them may be integrated and built into a chip. The method for forming an integrated circuit is not limited to LSI, and may be implemented by a dedicated circuit or a general-purpose processor. In the case of the advent of integrated circuit technology replacing LSI due to the advancement of semiconductor technology, it is also possible to use an integrated circuit based on this technology. The respective functional blocks of the mobile station device 5 and the base station device 3 may be implemented by a plurality of circuits.

Information and signals may be represented using any of a variety of different technologies and methods. For example, chips, symbols, bits, signals, information, commands, and data that may be referenced throughout the foregoing description may be represented by voltages, currents, electromagnetic waves, magnetic fields or particles, optical fields or particles, or any combination thereof.

The variety of illustrative logical blocks, processing units, and algorithm steps described in connection with the embodiments disclosed herein may be implemented as electronic hardware, computer software, or any combination of both. To clarify the interchangeability of hardware and software, a variety of illustrative elements, blocks, modules, circuits, and steps have been described above generally in terms of their functionality. Whether such functionality is implemented as hardware or software depends upon design constraints imposed on the individual applications and the entire system. A person skilled in the art may implement the aforementioned functionality in a variety of ways for each specific application. However, the determination of such implementations should not be construed as a departure from the scope of this disclosure.

The variety of illustrative logical blocks and processing units described in connection with the embodiments disclosed herein may be implemented or executed using a general-purpose processor, a digital signal processor (DSP), an application specific integrated circuit (ASIC), a field programmable gate array signal (FPGA), or other programmable logic device, discrete gate or transistor logic, discrete hardware components, or any combination thereof designed to execute the functions described herein. A general-purpose processor may be a microprocessor, or, as an alternative, a processor may be an existing processor, a controller, a microcontroller, or a state machine. A processor may also be implemented as a combination of computing devices, for example, a combination of a DSP and a microprocessor, a plurality of microprocessors, one or more microprocessors connected to a DSP core, or any other such configuration.

The steps of a method algorithm described in connection with the embodiments disclosed herein may be embodied directly in hardware, in a software module executed by a processor, or in a combination of the two. A software module may reside in a RAM memory, a flash memory, a ROM memory, an EPROM memory, an EEPROM memory, registers, a hard disk, a removable disk, a CD-ROM, or any other form of recording medium known in the art. An exemplary recording medium may be coupled to a processor such that the processor can read information from the recording medium, and write information to the recording medium. In another method, a recording medium may be integrated into a processor. The processor and the recording medium may reside in an ASIC. The ASIC may reside in a mobile station device (user terminal). Alternatively, the processor and the recording medium may reside as discrete elements in the mobile station device 5.

In one or more exemplary designs, the functions described herein may be implemented in hardware, software, firmware, or any combination thereof. If implemented in software, the functions may be held or transmitted as one or more instructions or code on a computer-readable medium. Computer-readable media include both computer recording media and communication media including any medium that facilitates transfer of a computer program from one place to another. A recording medium may be any commercially available medium accessible by a general-purpose or special-purpose computer. By way of example, but not limited thereto, such computer-readable media can comprise a RAM, a ROM, an EEPROM, a CD ROM or any other optical disk medium, magnetic disk medium or any other magnetic recording medium, or any other medium that can be used to carry or hold desired program code means in the form of instructions or data structures and that can be accessed by a general-purpose or special-purpose computer or a general-purpose or special-purpose processor. In addition, any connection is properly termed a computer-readable medium. For example, if the software is transmitted from a website, server, or any other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc (registered trademark), optical disc, digital versatile disc (DVD), floppy (registered trademark) disk, and blu-ray disc, where disks generally reproduce data magnetically, while discs reproduce data optically with lasers. Combinations of the above should also be included within the scope of computer-readable media.

While some embodiments of this invention have been described in detail with reference to the drawings, specific configurations are not limited to those of those embodiments, and various designs and the like without departing from the scope of this invention also fall within the scope of the claimed invention.

REFERENCE SIGNS LIST

3 base station device
4 (A to C) RRH
5 (A to C) mobile station device
101 reception processing unit
103 radio resource control unit
105 control unit
107 transmission processing unit
109 receive antenna
111 transmit antenna
201, 201-1 to 201-M physical downlink shared channel processing unit
203, 203-1 to 203-M physical downlink control channel processing unit
205 downlink pilot channel processing unit
207 multiplexing unit
209 IFFT unit
211 GI insertion unit
213 D/A unit
215 transmit RF unit
219 turbo encoding unit
221 data modulation unit
223 convolutional coding unit
225 QPSK modulation unit
227 precoding processing unit (for PDCCH)
229 precoding processing unit (for PDSCH)
231 precoding processing unit (for downlink pilot channels)
301 receive RF unit
303 A/D unit
309 symbol timing detection unit
311 GI removal unit
313 FFT unit
315 subcarrier demapping unit
317 channel estimation unit
319 channel equalization unit (for PUSCH)
321 channel equalization unit (for PUCCH)
323 IDFT unit
325 data demodulation unit
327 turbo decoding unit
329 physical uplink control channel detection unit
331 preamble detection unit
333 SRS processing unit
401 reception processing unit
403 radio resource control unit
405 control unit
407 transmission processing unit
409 receive antenna
411 transmit antenna
501 receive RF unit
503 A/D unit
505 symbol timing detection unit
507 GI removal unit
509 FFT unit
511 demultiplexing unit
513 channel estimation unit
515 channel compensation unit (for PDSCH)
517 physical downlink shared channel decoding unit
519 channel compensation unit (for PDCCH)
521 physical downlink control channel decoding unit
523 data demodulation unit
525 turbo decoding unit
527 QPSK demodulation unit
529 Viterbi decoder unit
531 downlink reception quality measurement unit
605 D/A unit
607 transmit RF unit
611 turbo encoding unit
613 data modulation unit
615 DFT unit
617 uplink pilot channel processing unit
619 physical uplink control channel processing unit
621 subcarrier mapping unit
623 IFFT unit
625 GI insertion unit 627 transmit power adjustment unit
629 random access channel processing unit
4051 path loss calculation unit
4053 transmit power setting unit
4055 power headroom control unit

The invention claimed is:

1. A mobile station apparatus for communicating with a first base station apparatus and a second base station apparatus, the mobile station apparatus comprising:
reception processing circuitry that receives a first reference signal from the first base station apparatus, and receives a second reference signal from the second base station apparatus;
path loss calculation circuitry that calculates first and second path losses, each of the first and second path losses being based on one of first and second types of reference signals, the first type of reference signals corresponding to the first reference signal received by the reception processing circuitry and the second type of reference signals corresponding to the second reference signal received by the first reception processing circuitry;
transmit power setting circuitry that sets a desired transmit power for an uplink signal using the first and second path losses calculated by the path loss calculation circuitry; and
power headroom control circuitry that generates a power headroom using the desired transmit power set by the transmit power setting circuitry, the power headroom being information concerning transmit power to spare, and that controls transmission of the power headroom, wherein
the power headroom control circuitry independently controls first and second power headroom transmission processes that use each of the first and second path losses calculated based on the first and second types of reference signals, using an independent parameter for each of the first and second power headroom transmission processes.

2. The mobile station device according to claim 1, wherein each of the first and second types of reference signals is one of a Cell specific Reference Signal (CRS) and a Channel State Information Reference Signal (CSI-RS).

3. The mobile station device according to claim 1, wherein the first and second types of reference signals are Channel State Information Reference Signals (CSI-RSs) having different configurations.

4. The mobile station device according to claim 1, wherein the independent parameter is at least one of periodicPHR-Timer, prohibitPHR-Timer, and dl-PathlossChange.

5. The mobile station apparatus according to claim 1, wherein the first and second types of reference signals are Cell specific Reference Signals (CRSs) having different configurations.

6. The mobile station apparatus according to claim 1, wherein
at least one first cell belongs to the first base station apparatus,
at least one second cell belongs to the second base station apparatus, and
in a case that the at least one second cell is provided, the power headroom control circuitry generates a power headroom report for the at least one first cell and the at least one second cell.

7. The mobile station apparatus according to claim 6, further comprising:
a radio resource control circuitry that sets a periodic PHR (power headroom report) timer.

8. The mobile station apparatus according to claim 7, wherein
the power headroom control circuitry generates the power headroom report for the at least one first cell in a case that the periodic PHR timer expires.

9. The mobile station apparatus according to claim 8, wherein
in a case that simultaneous transmission of a physical uplink control channel and a physical uplink shared channel occurs, the power headroom control circuitry obtains a value of a power headroom of both of the physical uplink control channel and the physical uplink shared channel for each of the at least one first cell and the at least one second cell.

10. The mobile station apparatus according to claim 9, wherein
the reception processing circuitry measures a reference signal received power of a cell specific reference signal, and
the reception processing circuitry measures a reference signal received power of a channel state information reference signal in a case that at least one configuration of the channel state information reference signal is a configuration for a reference signal received power measurement.

11. The mobile station apparatus according to claim 10, wherein
the reception processing circuitry measures the reference signal received power of the channel state information reference signal according to each configuration in a case that two or more configurations of the channel state information reference signal are configurations for the reference signal received power measurement.

12. A mobile station apparatus for communicating with a first base station apparatus and a second base station apparatus, the mobile station apparatus comprising:
reception processing circuitry that receives a first reference signal from the first base station apparatus, and that receives a second reference signal from the second base station apparatus;
path loss calculation circuitry that calculates first and second path losses, each based on one of first and second types of reference signals, the first type of reference signals corresponding to the first reference signal received by the reception processing circuitry and the second type of reference signals corresponding to the second reference signal received by the reception processing circuitry;
transmit power setting circuitry that sets a desired transmit power for an uplink signal using the first and second path losses calculated by the path loss calculation circuitry; and
power headroom control circuitry that generates a power headroom using the desired transmit power set by the transmit power setting circuitry, the power headroom being information concerning transmit power to spare, and that controls transmission of the power headroom, wherein
the power headroom control circuitry uses common dl-PathlossChange for a transmission process for power headrooms that use the first and second path losses calculated based on the first and second types of reference signals, and performs control to transmit the power headrooms in a case where an amount by which one of the first and second path losses calculated by the path loss calculation circuitry has changed is more than a value of dl-PathlossChange.

13. A mobile station apparatus for communicating with a first base station apparatus and a second base station apparatus, the mobile station apparatus comprising:
- reception processing circuitry that receives a first signal from the first base station apparatus, and receives a second signal from the second base station apparatus;
- path loss calculation circuitry that calculates first and second unit path losses, each based on one of first and second types of reference signals, the first type of reference signals corresponding to the first reference signal received by the reception processing circuitry and the second type of reference signals corresponding to the second reference signal received by the reception processing circuitry;
- transmit power setting circuitry that sets a desired transmit power for an uplink signal using the first and second path losses calculated by the path loss calculation circuitry; and
- power headroom control circuitry that generates a power headroom using the desired transmit power set by the transmit power setting circuitry, the power headroom being information concerning transmit power to spare, and that controls transmission of the power headroom, wherein
- the power headroom control circuitry uses dl-PathlossChange for a transmission process for one given power headroom among power headrooms that use the first and second path losses calculated based on the first and second types of reference signals, and performs control to transmit the power headrooms that use the first and second path losses calculated based on the first and second types of reference signals in a case where an amount by which a path loss used in the transmission process for the one given power headroom has changed is more than a value of dl-PathlossChange.

* * * * *